US010234293B2

(12) United States Patent
Matsushita

(10) Patent No.: US 10,234,293 B2
(45) Date of Patent: Mar. 19, 2019

(54) INERTIAL DEVICE INCLUDING AN ACCELERATION, METHOD PERFORMED BY THE SAME, AND PROGRAM

(71) Applicant: Yusuke Matsushita, Kanagawa (JP)

(72) Inventor: Yusuke Matsushita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 414 days.

(21) Appl. No.: 14/763,184

(22) PCT Filed: Jan. 28, 2014

(86) PCT No.: PCT/JP2014/052590
§ 371 (c)(1),
(2) Date: Jul. 24, 2015

(87) PCT Pub. No.: WO2014/119799
PCT Pub. Date: Aug. 7, 2014

(65) Prior Publication Data
US 2015/0354967 A1 Dec. 10, 2015

(30) Foreign Application Priority Data

Feb. 1, 2013 (JP) ................... 2013-018464
Nov. 6, 2013 (JP) ................... 2013-230049

(51) Int. Cl.
G01C 21/16 (2006.01)
H04W 4/02 (2018.01)
G01C 21/20 (2006.01)

(52) U.S. Cl.
CPC ........... G01C 21/165 (2013.01); G01C 21/16 (2013.01); G01C 21/206 (2013.01); H04W 4/027 (2013.01)

(58) Field of Classification Search
CPC .... G01C 21/165; G01C 21/206; G01C 21/16; H04W 4/027
(Continued)

(56) References Cited

U.S. PATENT DOCUMENTS 6,546,336 B1 4/2003 Matsuoka et al.
6,820,002 B2 11/2004 Terada
(Continued)

FOREIGN PATENT DOCUMENTS

JP 2000-097722 4/2000
JP 2000-356520 12/2000
(Continued)

OTHER PUBLICATIONS

Extended European Search Report dated Feb. 10, 2016.
(Continued)

Primary Examiner — Tha-O H Bui
(74) Attorney, Agent, or Firm — IPUSA, PLLC

(57) ABSTRACT

An inertial device having sensors operable to output accelerations in a horizontal and a vertical direction is disclosed that includes a detection unit configured to detect a turning point in a waveform representing the acceleration in the vertical direction with respect to time and to detect time at the turning point; a calculation unit configured to calculate a velocity in the horizontal direction using the acceleration in the horizontal direction in a predetermined period centering on the time at the turning point; a determination unit configured to determine whether the velocity is less than or equal to a threshold value; and an estimation unit configured to estimate a direction to which a target having the inertial device moves using the velocity in response to a determination by the determination unit that the velocity is less than or equal to the threshold value.

12 Claims, 24 Drawing Sheets

(58) Field of Classification Search
USPC .......................................................... 702/150
See application file for complete search history.

(56) References Cited

U.S. PATENT DOCUMENTS

| | | | |
|---|---|---|---|
| 8,249,914 B2 | 8/2012 | Umeda | |
| 8,280,398 B2 | 10/2012 | Ishii et al. | |
| 2003/0191582 A1 | 10/2003 | Terada | |
| 2006/0217921 A1* | 9/2006 | Kourogi | G01C 17/38 702/150 |
| 2010/0004860 A1* | 1/2010 | Chernoguz | G01C 22/006 701/494 |
| 2013/0138390 A1* | 5/2013 | Shikatani | G01C 21/10 702/141 |

FOREIGN PATENT DOCUMENTS

| | | | |
|---|---|---|---|
| JP | 2000356520 A * | 12/2000 | |
| JP | 2002-139340 | 5/2002 | |
| JP | 2003-302419 | 10/2003 | |
| JP | 2005-128775 | 5/2005 | |
| JP | 2005-158007 | 6/2005 | |
| JP | 2005-283386 | 10/2005 | |
| JP | 2005283386 A * | 10/2005 | |
| JP | 4126388 | 7/2008 | |
| JP | 2009-075036 | 4/2009 | |
| JP | 2011-237452 | 11/2011 | |
| JP | 2012-037452 | 2/2012 | |
| JP | 2012037452 A * | 2/2012 | G01C 21/10 |
| JP | 2012-145457 | 8/2012 | |
| JP | 5056009 | 10/2012 | |
| WO | 2012/157652 | 11/2012 | |

OTHER PUBLICATIONS

International Search Report dated Apr. 15, 2014 in PCT/JP2014/052590 filed on Jan. 28, 2014.
Kourogi Masakatsu et al., "Pedestrian Positioning Technologies Using Wearable Self-contained Sensors", The Journal of the Institute of Electronics, Information and Communication Engineers, 2009, vol. 92, No. 4, pp. 268-275.
Greg Welch et al., "An Introduction to the Kalman Filter", TR 95-041, Department of Computer Science, University of North Carolina at Chapel Hill, Jul. 24, 2006.
"Extended Kalman filter", [online], Wikipedia, the free encyclopedia, May 3, 2015, the Internet URL: http://en.wikipedia.org/wiki/Extended_Kalman_filter.
Wei Tech Ang et al., "Kalman filtering for real-time orientation tracking of handheld microsurgical instrument", Proceedings of 2004 IEEE/RSJ International Conference on Intelligent Robots and Systems, Sep. 28, 2004, vol. 3, pp. 2574-2580.
Malcolm D. Shuster, "Deterministic Three-Axis Attitude Determination", The Journal of the Astronautical Sciences, Jul. 2004, vol. 52, No. 3, pp. 405-419.
"User:Snietfeld/TRIAD Algorithm", [online], Wikipedia, the free encyclopedia, May 25, 2011, the Internet URL: http://en.wikipedia.org/wiki/User:Snietfeld/TRIAD_Algorithm.
Chinese Office Action for 201480017755.0 dated Jan. 17, 2017.

* cited by examiner

FIG.1
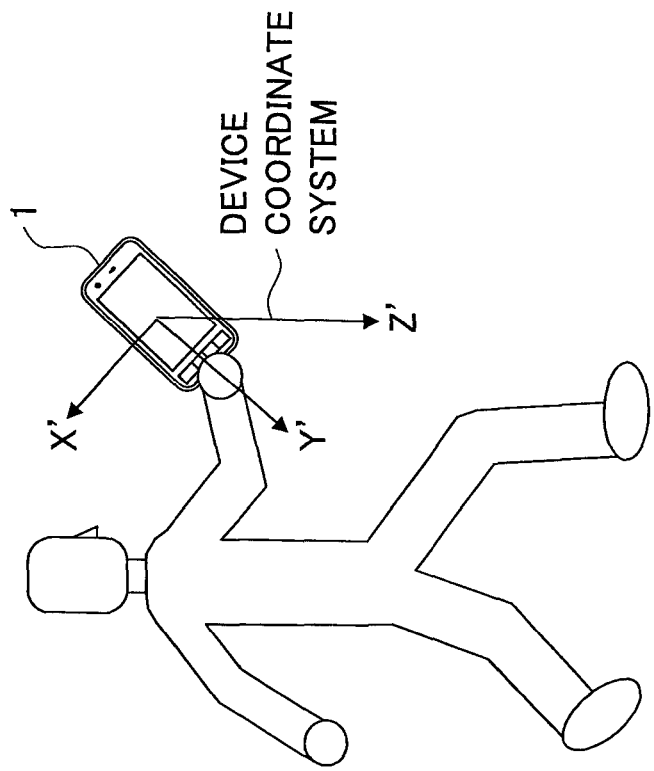
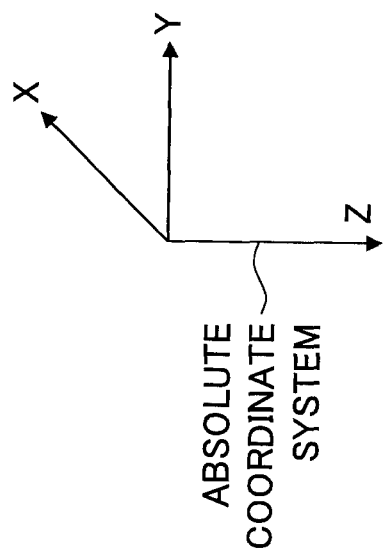

(1) VARIABLES OF SYSTEM STATE ESTIMATE MODEL (TIME UPDATE MODEL)

$\hat{x}_{k|k-1}$ : STATE ESTIMATE VALUES (VECTOR) AT PRESENT ...(1)-1

$f(\hat{x}_{k-1|k-1}, u_k, 0)$ : STATE ESTIMATE MODEL EQUATION ...(1)-2

$\hat{x}_{k-1|k-1}$ : STATE ESTIMATE VALUES (VECTOR) AT THE PREVIOUS STEP ...(1)-3

$u_k$ : INPUT VALUES (VECTOR) AT PRESENT ...(1)-4

(1) SYSTEM STATE ESTIMATE MODEL (TIME UPDATE MODEL)

$$\hat{x}_{k|k-1} = f(\hat{x}_{k-1|k-1}, u_k, 0) \quad \cdots (1)-5$$

DEFINITION OF STATE ESTIMATE VALUES $$x_{k|k-1} = [w_k \quad x_k \quad y_k \quad z_k \quad bx_k \quad by_k \quad bz_k]^T \quad \cdots (1)-1$$

DEFINITION OF INPUT VALUES $$u_k = \begin{bmatrix} \omega_{xk} \\ \omega_{yk} \\ \omega_{zk} \end{bmatrix} = \begin{bmatrix} \omega_{0xk} - bx_k \\ \omega_{0yk} - by_k \\ \omega_{0zk} - bz_k \end{bmatrix} \quad \cdots (1)-4$$

SYSTEM STATE ESTIMATE MODEL (TIME UPDATE MODEL)

$x_{k|k-1} = Ax_{k-1|k-1}$ $$\begin{bmatrix} w_k \\ x_k \\ y_k \\ z_k \\ bx_k \\ by_k \\ bz_k \end{bmatrix} = \frac{1}{2} \begin{bmatrix} 2 & -\omega_x t & -\omega_y t & -\omega_z t & 0 & 0 & 0 \\ \omega_x t & 2 & -\omega_z t & \omega_y t & 0 & 0 & 0 \\ \omega_y t & \omega_z t & 2 & -\omega_x t & 0 & 0 & 0 \\ \omega_z t & -\omega_y t & \omega_x t & 2 & 0 & 0 & 0 \\ 0 & 0 & 0 & 0 & C_1 & 0 & 0 \\ 0 & 0 & 0 & 0 & 0 & C_2 & 0 \\ 0 & 0 & 0 & 0 & 0 & 0 & C_3 \end{bmatrix} \begin{bmatrix} w_{k-1} \\ x_{k-1} \\ y_{k-1} \\ z_{k-1} \\ bx_{k-1} \\ by_{k-1} \\ bz_{k-1} \end{bmatrix} \quad \cdots (1)-5$$

($C_1$, $C_2$, $C_3$: GIVEN VALUES)

FIG.5

(2) PARTIAL DIFFERENTIAL MATRIX (JACOBIAN) AT TIME UPDATE $F_k = \dfrac{\partial f}{\partial x}$ : PARTIAL DIFFERENTIAL MATRIX (JACOBIAN) AT TIME UPDATE  ...(2)-1

: CALCULATE JACOBIAN BY PARTIALLY DIFFERENTIATING THE STATE ESTIMATE MODEL EQUATION AT PRESENT  ...(2)-2

$$F_k = \left.\dfrac{\partial f}{\partial x}\right|_{\hat{x}_{k-1|k-1}, u_k} \quad \cdots(2)\text{-}3$$

SYSTEM STATE ESTIMATE MODEL (TIME UPDATE MODEL)

$x_{k|k-1} = A x_{k-1|k-1} \quad \cdots(1)\text{-}5$ $$\begin{bmatrix} w_k \\ x_k \\ y_k \\ z_k \\ bx_k \\ by_k \\ bz_k \end{bmatrix} = \dfrac{1}{2}\begin{bmatrix} 2 & -\omega_x t & -\omega_y t & -\omega_z t & 0 & 0 & 0 \\ \omega_x t & 2 & \omega_z t & -\omega_y t & 0 & 0 & 0 \\ \omega_y t & -\omega_z t & 2 & \omega_x t & 0 & 0 & 0 \\ \omega_z t & \omega_y t & -\omega_x t & 2 & 0 & 0 & 0 \\ 0 & 0 & 0 & 0 & C_1 & 0 & 0 \\ 0 & 0 & 0 & 0 & 0 & C_2 & 0 \\ 0 & 0 & 0 & 0 & 0 & 0 & C_3 \end{bmatrix}\begin{bmatrix} w_{k-1} \\ x_{k-1} \\ y_{k-1} \\ z_{k-1} \\ bx_{k-1} \\ by_{k-1} \\ bz_{k-1} \end{bmatrix}$$

$= f \quad \cdots(1)\text{-}5$ $(C_1, C_2, C_3: \text{GIVEN VALUES})$

FIG.6

(3) ERROR COVARIANCE ESTIMATE MODEL (ACCURACY OF ESTIMATE VALUES)

$P_{k|k-1}$ : ERROR COVARIANCE AT PRESENT ...(3)-1

$P_{k-1|k-1}$ : ERROR COVARIANCE AT THE PREVIOUS STEP ...(3)-2

$F_k^T$ : TRANSPOSED MATRIX OF PARTIAL DIFFERENTIAL MATRIX (JACOBIAN) AT TIME UPDATE ...(3)-3

$Q_k$ : PROCESS NOISE (MATRIX) ...(3)-4

(3) ERROR COVARIANCE ESTIMATE MODEL (ACCURACY OF ESTIMATE VALUES)

$$P_{k|k-1} = F_k P_{k-1|k-1} F_k^T + Q_k \quad \cdots (3)\text{-}5$$

$$Q_k = \begin{bmatrix} q_{wk} & 0 & 0 & 0 & 0 & 0 & 0 \\ 0 & q_{xk} & 0 & 0 & 0 & 0 & 0 \\ 0 & 0 & q_{yk} & 0 & 0 & 0 & 0 \\ 0 & 0 & 0 & q_{zk} & 0 & 0 & 0 \\ 0 & 0 & 0 & 0 & q_{bxk} & 0 & 0 \\ 0 & 0 & 0 & 0 & 0 & q_{byk} & 0 \\ 0 & 0 & 0 & 0 & 0 & 0 & q_{bzk} \end{bmatrix}$$

FIG.7

(1) OBSERVATION RESIDUALS $\tilde{y}_k$ : OBSERVATION RESIDUALS (VECTOR) ...(1)-1

$z_k$ : OBSERVATION VALUES (VECTOR) ...(1)-2

$h(\hat{x}_{k|k-1}, 0)$ : OBSERVATION VALUES (VECTOR) AT THE PREVIOUS STEP ...(1)-3

(1) OBSERVATION RESIDUALS $$\tilde{y}_k = z_k - h(\hat{x}_{k|k-1}, 0) \quad \cdots (1)\text{-}4$$

OBSERVATION VALUES (VECTOR)

$$z_k = \frac{1}{\sqrt{a_x a_x + a_y a_y + a_z a_z}} \begin{bmatrix} a_x \\ a_y \\ a_z \end{bmatrix} \quad \cdots (1)\text{-}2$$

OBSERVATION VALUES (VECTOR) AT THE PREVIOUS STEP $$h = \begin{bmatrix} 2x_k z_k - 2w_k y_k \\ 2y_k z_k + 2w_k x_k \\ 1 - 2(x_k x_k + y_k y_k) \end{bmatrix} \quad \cdots (1)\text{-}3$$

FIG.8

(1) OBSERVATION RESIDUALS

$\tilde{y}_k$ : OBSERVATION RESIDUALS (VECTOR) ...(1)-1

$z_k$ : OBSERVATION VALUES (VECTOR) ...(1)-2

$h(\hat{x}_{k|k-1}, 0)$ : OBSERVATION VALUES (VECTOR) AT THE PREVIOUS STEP ...(1)-3

$$\tilde{y}_k = z_k - h(\hat{x}_{k|k-1}, 0) \quad \cdots (1)\text{-}4$$

OBSERVATION VALUES (VECTOR)
$$z_k = \begin{bmatrix} TRIAD_x \\ TRIAD_y \\ TRIAD_z \end{bmatrix} \quad \cdots (1)\text{-}2$$

OBSERVATION VALUES (VECTOR) AT THE PREVIOUS STEP
$$h = \begin{bmatrix} 1 - 2(y_k y_k + z_k z_k) \\ 2x_k y_k - 2w_k z_k \\ 2x_k z_k + 2w_k y_k \end{bmatrix} \quad \cdots (1)\text{-}3$$

FIG.9

FIG.15
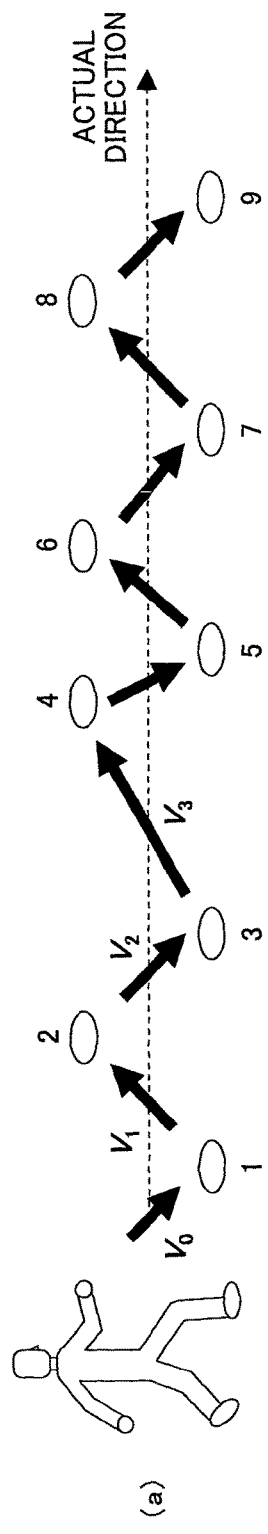
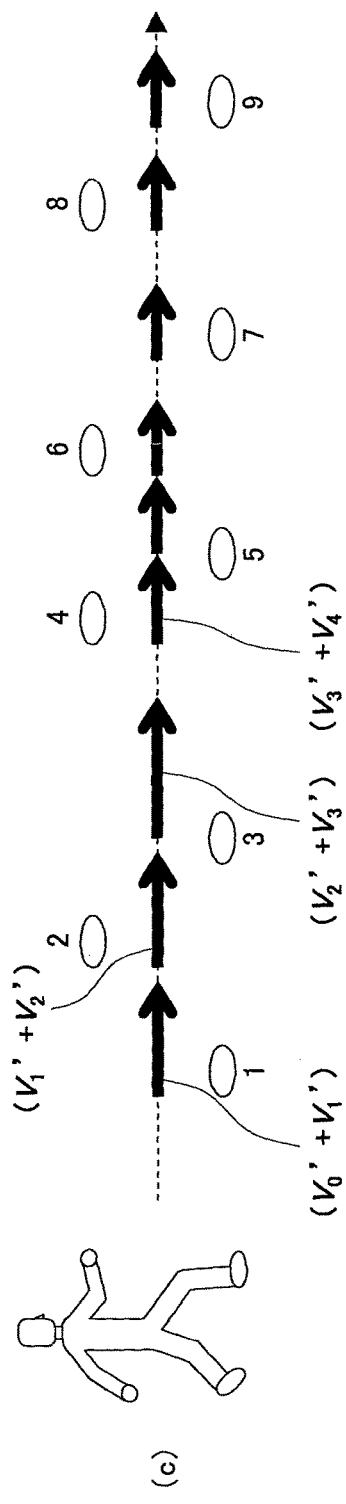

(1) VARIABLES OF SYSTEM STATE ESTIMATE MODEL (TIME UPDATE MODEL)

$\hat{x}_{k|k-1}$ : STATE ESTIMATE VALUES (VECTOR) AT PRESENT $f(\hat{x}_{k-1|k-1}, u_k, 0)$ : STATE ESTIMATE MODEL EQUATION $\hat{x}_{k-1|k-1}$ : STATE ESTIMATE VALUES (VECTOR) AT THE PREVIOUS STEP $u_k$ : INPUT VALUES (VECTOR) AT PRESENT

(2) PARTIAL DIFFERENTIAL MATRIX (JACOBIAN) AT TIME UPDATE $F_k$ : PARTIAL DIFFERENTIAL MATRIX (JACOBIAN) AT TIME UPDATE $\left. \frac{\partial f}{\partial x} \right|_{\hat{x}_{k-1|k-1}, u_k}$ : CALCULATE JACOBIAN BY PARTIALLY DIFFERENTIATING THE STATE

(3) ERROR COVARIANCE ESTIMATE MODEL (ACCURACY OF ESTIMATE VALUES)

$P_{k|k-1}$ : ERROR COVARIANCE AT PRESENT $P_{k-1|k-1}$ : ERROR COVARIANCE AT THE PREVIOUS STEP $F_k^T$ : TRANSPOSED MATRIX OF PARTIAL DIFFERENTIAL MATRIX (JACOBIAN) AT TIME UPDATE $Q_k$ : PROCESS NOISE (MATRIX): DIAGONAL MATRIX FOR STANDARD VARIATION OF ESTIMATE VALUES AT EACH COMPONENT

FIG.18

(PRIOR ART)

(1) OBSERVATION RESIDUALS $\tilde{y}_k$ : OBSERVATION RESIDUALS (VECTOR)

$z_k$ : OBSERVATION VALUES (VECTOR)

$h(\hat{x}_{k|k-1}, 0)$ : OBSERVATION VALUES (VECTOR) AT THE PREVIOUS STEP (2) PARTIAL DIFFERENTIAL MATRIX (JACOBIAN) AT MEASUREMENT UPDATE $H_k$ : PARTIAL DIFFERENTIAL MATRIX (JACOBIAN) AT MEASUREMENT UPDATE $\left.\dfrac{\partial h}{\partial x}\right|_{\hat{x}_{k|k-1}}$ : CALCULATE JACOBIAN BY PARTIALLY DIFFERENTIATING THE STATE ESTIMATE MODEL EQUATION AT PRESENT (3) RESIDUAL COVARIANCE $S_k$ : RESIDUAL COVARIANCE $P_{k|k-1}$ : RESIDUAL COVARIANCE MATRIX AT PRESENT $H_k^T$ : PARTIAL DIFFERENTIAL MATRIX (JACOBIAN) AT MEASURE UPDATE $R_k$ : OBSERVATION NOISE (MATRIX)

(4) KALMAN GAIN $K_k$ : KALMAN GAIN (MATRIX)

(5) UPDATED STATE ESTIMATE VALUES $\hat{x}_{k|k}$ : UPDATED STATE ESTIMATE VALUES $\hat{x}_{k|k-1}$ : STATE ESTIMATE VALUES (VECTOR) AT THE PREVIOUS STEP (6) UPDATED ERROR COVARIANCE MATRIX $P_{k|k}$ : UPDATED ERROR COVARIANCE MATRIX $I$ : IDENTITY MATRIX

FIG.19
(PRIOR ART)

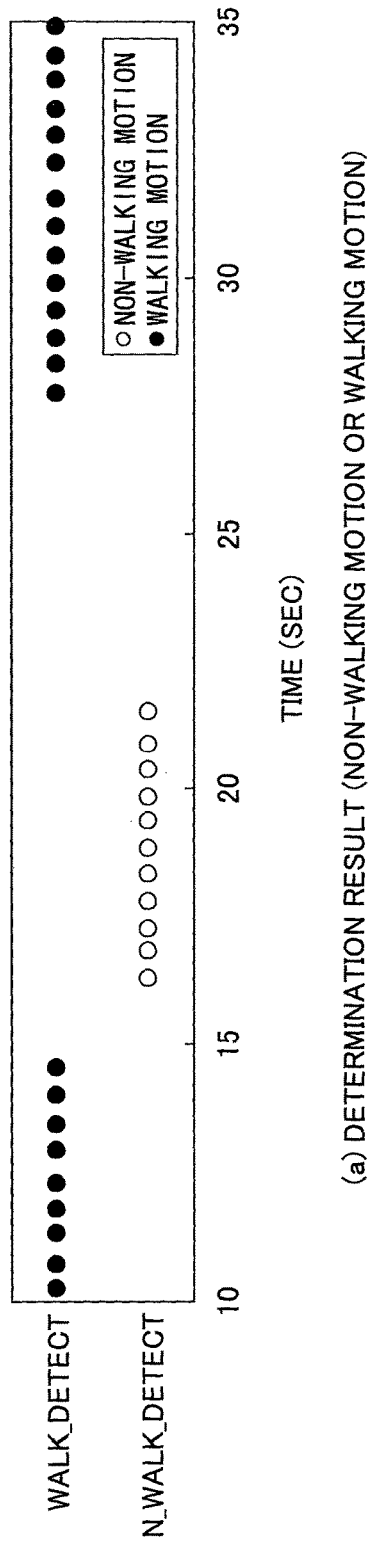
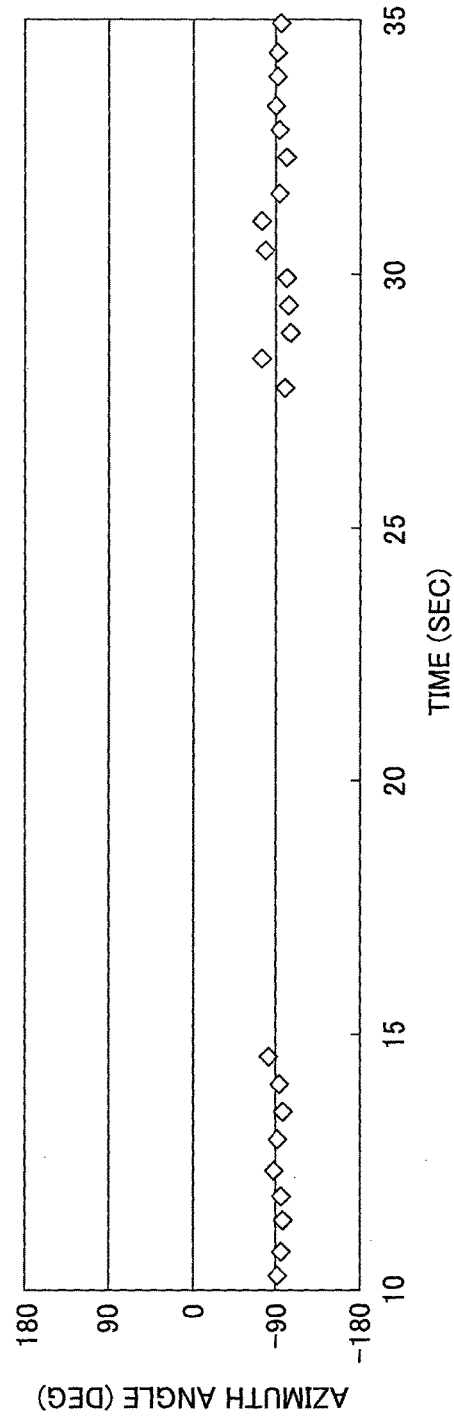
FIG.22

INERTIAL DEVICE INCLUDING AN ACCELERATION, METHOD PERFORMED BY THE SAME, AND PROGRAM

TECHNICAL FIELD

An aspect of this disclosure is related to an inertial device, a method, and a program.

BACKGROUND ART

At a location where a global positioning system (GPS) may not be used for measuring a position such as a building or the underground, the pedestrian dead reckoning (PDR) technique is used in order to estimate a position of a pedestrian on an inertial device including an acceleration sensor and a magnetic field sensor.

A conventional method using the PDR estimates a travelling direction and position by calculations executed in the inertial device which is attached and fixed to the body of a user to limit movement of the inertial device (Patent Documents 1 to 4).

On the other hand, a conventional method to estimate the direction and position by high load calculations using data obtained from a high performance inertial sensor (e.g. an acceleration sensor, angular velocity sensor (gyroscope), a magnetic field sensor, etc.) instead of attaching and fixing the inertial device to the body of the user (Patent Documents 5, 6). Such a calculation includes Fourier transformation (FT) or principal component analysis in order to estimate the direction using acceleration or angular velocity obtained by the sensor.

However, the conventional inertial device is inconvenient because the device needs to be fixed to a target (e.g. a user). In addition, since an inertial device which does not need to be fixed has to be high performance, the inertial device tends to be a higher cost, and it is hard to downsize the inertial device.

SUMMARY OF INVENTION

In one aspect, the present disclosure provides an inertial device, a method, and a program which substantially eliminates one or more problems caused by the limitations and disadvantages of the related art.

In an aspect of this disclosure, there is provided an inertial device having an acceleration sensor which is operable to output accelerations in a horizontal and a vertical direction, the inertial device including a detection unit configured to detect a turning point in a waveform representing the acceleration in the vertical direction with respect to time and to detect time at the turning point; a calculation unit configured to calculate a velocity in the horizontal direction using the acceleration in the horizontal direction in a predetermined period centering on the time at the turning point; a determination unit configured to determine whether the velocity is less than or equal to a threshold value; and an estimation unit configured to estimate a direction to which a target having the inertial device moves using the velocity in response to a determination by the determination unit that the velocity is less than or equal to the threshold value.

According to another embodiment of this invention, there is provided a method performed by an inertial device having an acceleration sensor which is operable to output accelerations in a horizontal and a vertical direction, the method including detecting a turning point in a waveform representing the acceleration in the vertical direction with respect to time and to detect time at the turning point; calculating a velocity in the horizontal direction using the acceleration in the horizontal direction in a predetermined period centering on the time at the turning point; and determining whether the velocity is less than or equal to a threshold value; and estimating a direction to which a target having the inertial device moves using the velocity in response to the determination that the velocity is less than or equal to the threshold value.

According to another embodiment of this invention, there is provided a program for causing an inertial device having an acceleration sensor which is operable to output accelerations in a horizontal and a vertical direction to perform a method including detecting a turning point in a waveform representing the acceleration in the vertical direction with respect to time and to detect time at the turning point; calculating a velocity in the horizontal direction using the acceleration in the horizontal direction in a predetermined period centering on the time at the turning point; and determining whether the velocity is less than or equal to a threshold value; and estimating a direction to which a target having the inertial device moves using the velocity in response to the determination that the velocity is less than or equal to the threshold value.

BRIEF DESCRIPTION OF DRAWINGS

FIG. 1 is a drawing illustrating an overview of an inertial device according to an embodiment of this invention.

FIG. 5 is a drawing illustrating an operation to calculate a posture (roll, pitch, and yaw angles) at the Time Update procedure.

FIG. 6 is a drawing illustrating an operation to calculate a posture (roll, pitch, and yaw angles) at the Time Update procedure.

FIG. 7 is a drawing illustrating an operation to calculate a posture (roll, pitch, and yaw angles) at the Time Update procedure.

FIG. 8 is a drawing illustrating an operation to calculate a posture (roll and pitch angles) at the First Measurement Update procedure.

FIG. 9 is a drawing illustrating an operation to calculate a posture (a yaw angle) at the Second Measurement Update procedure.

FIG. 15 is a drawing illustrating a procedure to estimate traveling direction.

FIG. 18 is a drawing illustrating variables used in the Time Update procedure (prior art).

FIG. 19 is a drawing illustrating variables used in the Measurement Update procedure (prior art).

FIG. 22 is a drawing illustrating an estimate result of traveling directions at a determination of walking motions and non-walking motions.

DESCRIPTION OF EMBODIMENTS

Figure 2:
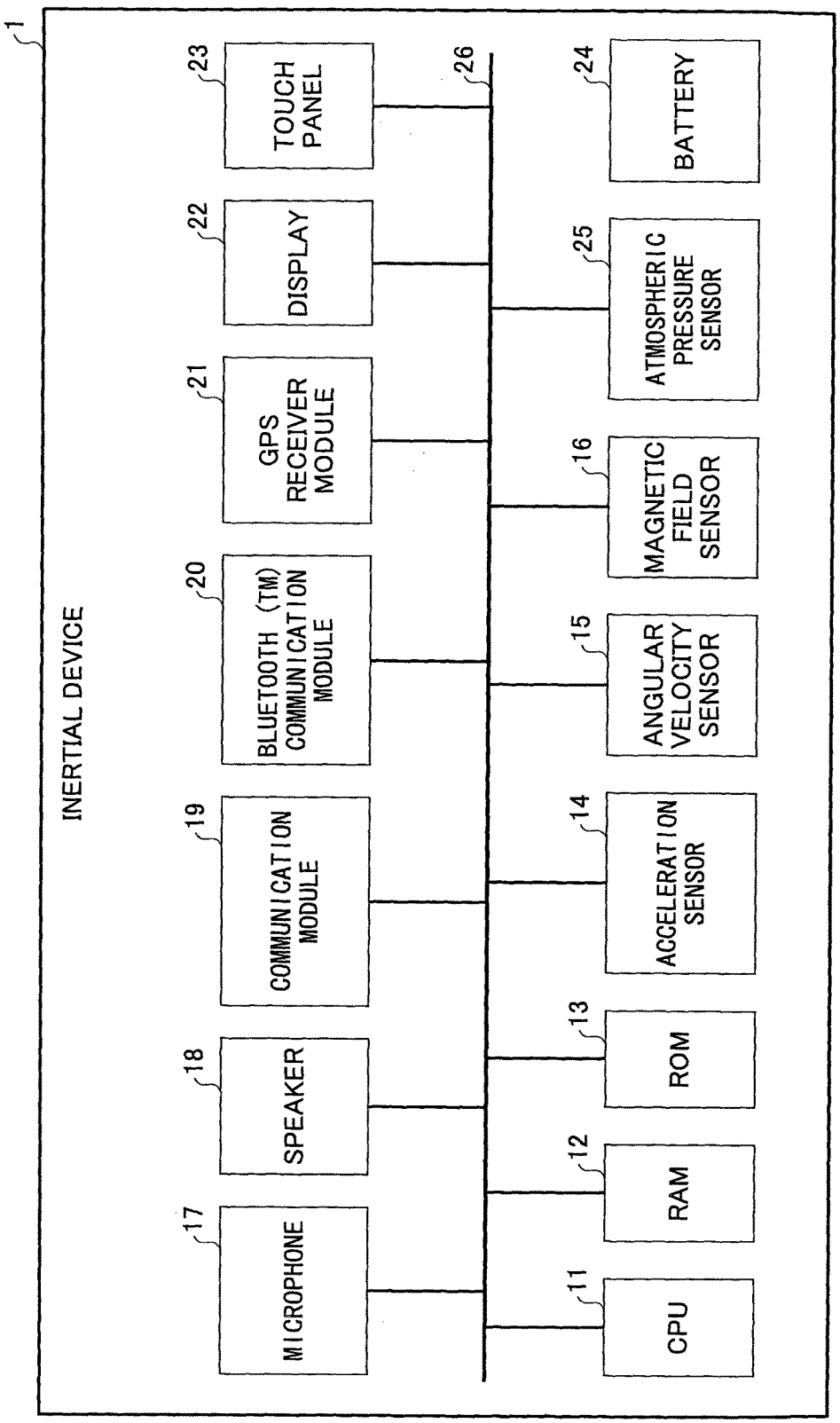
FIG. 2 is a drawing illustrating an overview of a configuration for an inertial device according to an embodiment of this invention.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

1. Overview

FIG. 1 is a drawing illustrating an overview of an inertial device according to an embodiment of this invention. FIG. 1 shows a user who walks with the inertial device 1. In the present specification, a direction to which the user walks is represented as the x-axis, a direction which is vertical to the x-axis and on a parallel with the ground is represented as the y-axis, and a direction which is vertical to both the x-axis and the y-axis is represented as the z-axis.

The inertial device 1 is portable and may be carried by the user (e.g. a cell phone, a smartphone, a personal digital assistant or a notebook PC). The inertial device 1 has inertial sensors (e.g. an acceleration sensor, an angular velocity sensor, a magnetic field sensor, etc.), which is implemented in a common smartphone. The inertial device 1 may detect variations of acceleration and angular velocity and a direction of the inertial device 1.

The inertial device 1 according to an embodiment of the invention may obtain sensor data including acceleration on three axes (3 axis acceleration), angular velocity on three axes (3 axis angular velocity), and strength of the magnetic field on three axes (3 axis magnetic field strength) as needed. A coordinate system depends on a device or sensor type, which is called the "device coordinate system". Thus, measured values obtained in the device coordinate system are converted into the an absolute coordinate system.

The inertial device 1 may obtain converted acceleration (vector) in the absolute coordinate system. In particular, the inertial device 1 may obtain a vertical component and a horizontal component of the acceleration (the converted 3 axis acceleration) from the sensor data by converting the coordinate system and removing gravity from the converted sensor data. The inertial device 1 may identify the time when one foot of the target passes the other foot after the pivot foot lands on the ground using waveforms indicating variations of the converted acceleration in the vertical direction of the converted 3 axis acceleration obtained and stored as needed. Since the time indicates that the time when the lower turning points (lower peaks) are shown in the waveform, the time is called a "peak time" or a "peak position".

Next, the inertial device 1 may integrate the horizontal component of the converted acceleration in a predetermined period around the peak position. Here, the calculated values are referred to as a "horizontal component of the converted velocity vector". The inertial device 1 may determine that the obtained data indicates an actual walking motion (or a traveling action) of the target or not by using the calculated horizontal component of the converted velocity vector; a cycle of the moving action of the target; and the peak value of the vertical component of the converted acceleration or the peak amplitude (the value of peak acceleration in the vertical direction). Here, a cycle of the moving action of the target is called a "moving cycle". An example of the moving cycle is a human's walking cycle. In addition, the actual walking motion or the traveling action of the target is simply represented as the "walking motion" (including any actions other than "walking", though).

Next, when the inertial device 1 determines that the data derives from the actual walking motion, the inertial device 1 may combine the horizontal component of the converted velocity vectors around the time when the data is obtained, and the inertial device 1 may calculate a traveling direction vector indicating that the user takes a step as needed. Subsequently, the inertial device 1 may estimate a traveling direction indicated by combination of the last traveling direction vector and the previous direction vector.

In this way, since the inertial device 1 may estimate a traveling direction without Fourier transformation (FT) or principal component analysis, the inertial device 1 does not need to perform high rate sensor sampling due to low frequency of the acceleration signal for the walking motion of the target. In addition, since the inertial device 1 does not need to perform FT for a plurality of walking steps, an accuracy of the estimated traveling direction per step and a response of the estimation are improved. It makes it possible to reduce costs and downside the device.

Furthermore, since the way to hold the inertial device for the user is not limited, the usability may be improved. That merit is especially advantageous when the inertial device provides a navigational function for the user.

The inertial device 1 may be implemented as a device such as a music player, a health monitor, a watch, etc. other than the above-mentioned device. In addition, the inertial device 1 may be incorporated into another device (e.g. a walking robot or a collar for an animal). It makes it possible to estimate a traveling direction of various types of creatures or objects which makes a motion in the vertical direction within a certain cycle.

2. Hardware Configuration

FIG. 2 is a drawing illustrating an overview of a configuration for the inertial device 1 according to an embodiment of this invention. In the example shown in FIG. 2, the inertial device 1 is implemented as a mobile device such as a smartphone.

The inertial device 1 has a CPU 11, a RAM 12, a ROM 13, an acceleration sensor 14, an angular velocity sensor 15, a magnetic field sensor 16, a microphone 17, a speaker 18, a communication module 19, a Bluetooth™ communication module 20, a GPS receiver module 21, a display 22, a touch panel 23, a battery 24, an atmospheric pressure sensor 25, and a bus 26.

The CPU 11 may execute programs controlling the inertial device 1. The RAM 12 may work as a work area for the CPU 11. The ROM 13 may store the programs executed by the CPU 11 and data required to execute the programs. The acceleration sensor 14 may detect acceleration in the X'-axis, Y'-axis, and Z'-axis directions in the device coordinate system used by the inertial device 1. The angular velocity sensor 15 (or a gyroscope) may detect angular velocity in the X'-axis, Y'-axis, and Z'-axis directions in the device coordinate system used by the inertial device 1. The magnetic field sensor 16 may output a 3 dimensional vector causing the compass to point north and may be used to detect an aspect of the inertial device 1. The atmospheric pressure sensor 25 may measure an air pressure and detect altitude of the inertial device 1.

The microphone 17 may convert a voice into an electronic signal. The speaker 18 may output an electronic signal as a sound. The communication module 19 may communicate with other devices connected via a 3G network and/or a wireless LAN. The Bluetooth™ communication module 20 may communicate with other devices using Bluetooth protocols. The GPS receiver module 21 may receive positioning signals transmitted from GPS satellites or Indoor Messaging System (IMES) transmitters.

The display 22 may provide a screen for a user. The touch panel 23 may accept input from the user. The battery 24 may supply power to the inertial device 1. The bus 26 may connect the above-mentioned devices (except the battery 24) with each other.

The microphone 17, the speaker 18, the communication module 19, the Bluetooth™ communication module 20, the GPS receiver module 21, the display 22, the touch panel 23, and the atmospheric pressure sensor 25 are optional elements for the inertial device 1. For example, when the inertial device 1 is implemented as a health monitor which does not have a display screen, the inertial device 1 does not need to have such components modules.

Alternatively, the inertial device 1 may have a communication device according to other communication protocols (e.g. ZigBee™) instead of the Bluetooth™ communication module 20.

3. Functions

Figure 3:
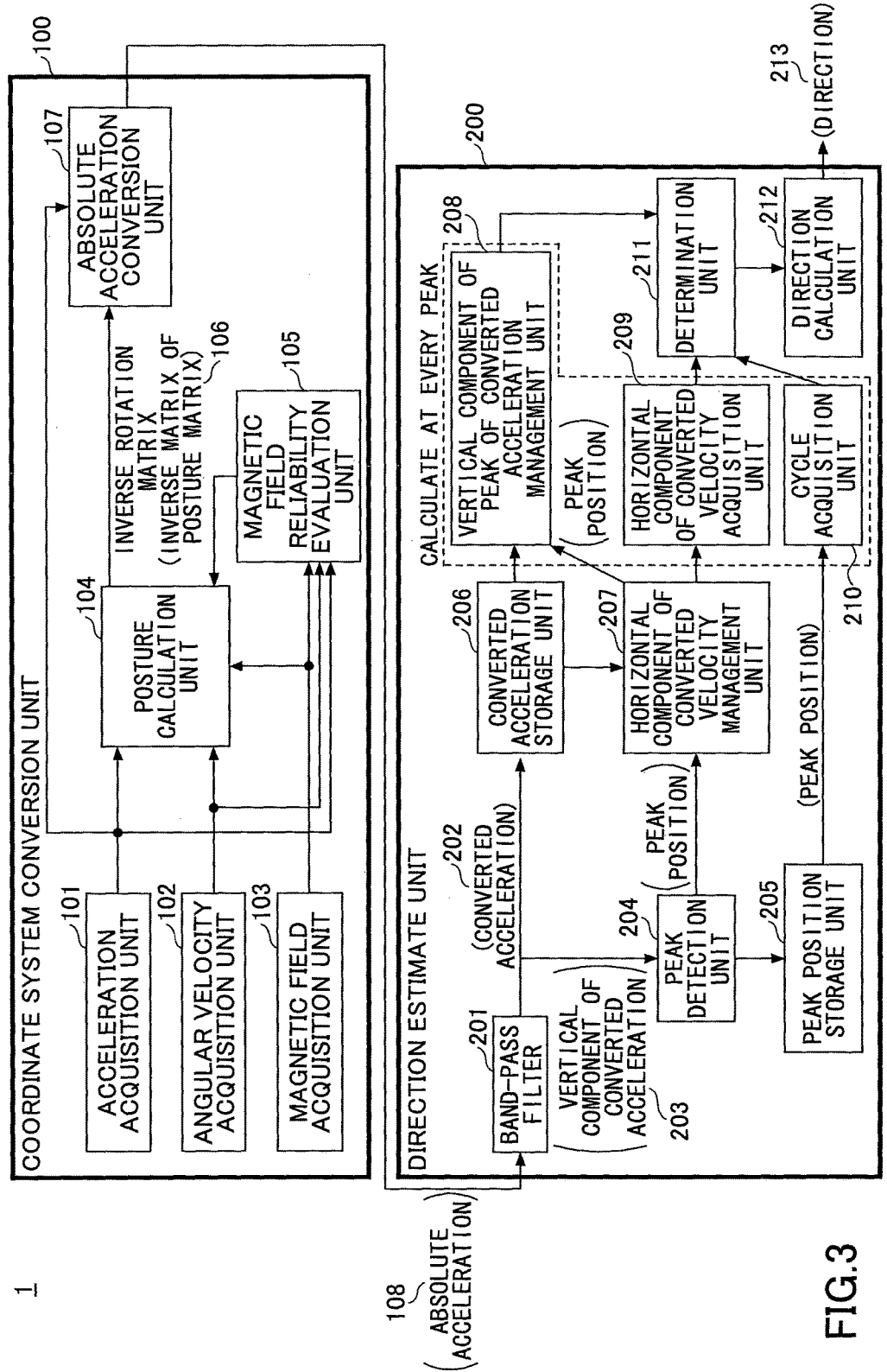
FIG. 3 is a block diagram of a functional configuration for an inertial device according to an embodiment of this invention.
Figure 4:
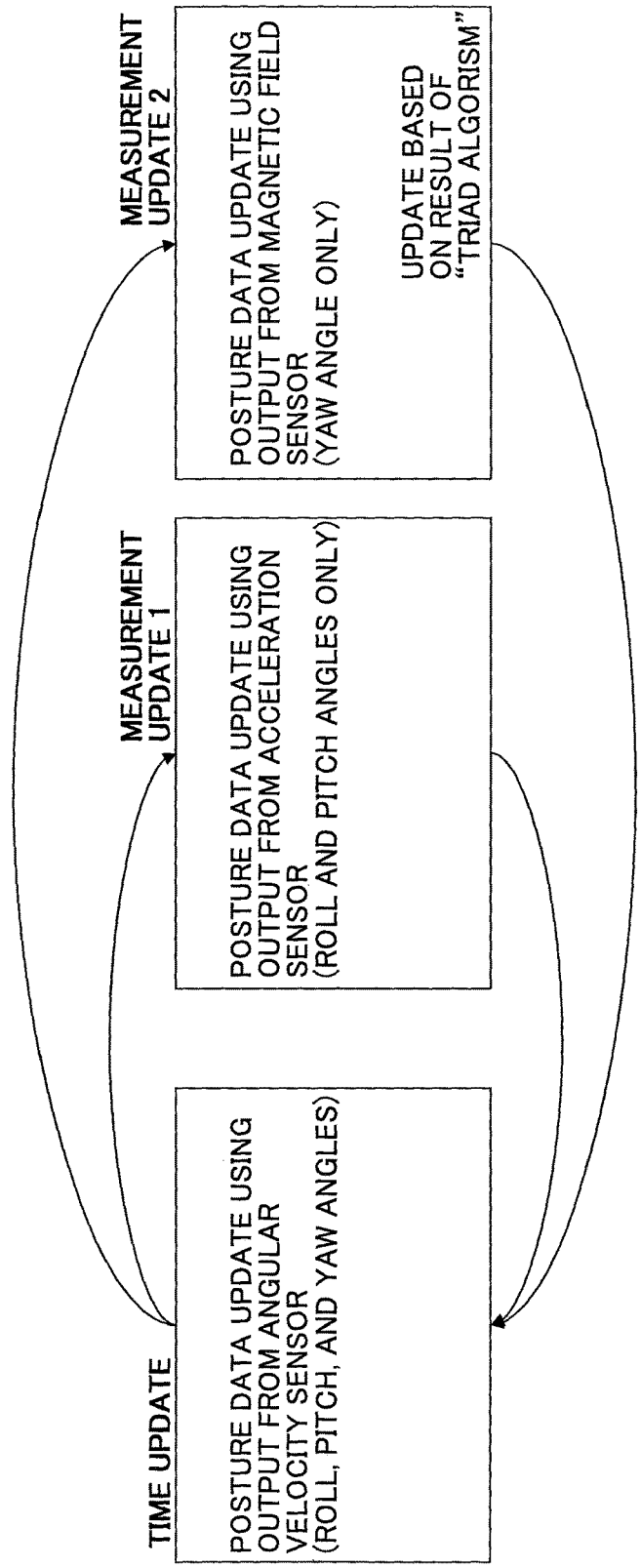
FIG. 4 is a drawing illustrating an overview of a procedure to calculate a posture.

FIG. 3 is a block diagram of a functional configuration for the inertial device 1. The functions of the inertial device 1 may be roughly divided into a "Change of Coordinate Systems" function and an "Estimation for Travelling Direction" function.

3.1 Change of Coordinate Systems

A coordinate system conversion unit 100, which performs a conversion of a coordinate system on the inertial device 1, has an acceleration acquisition unit 101, an angular velocity acquisition unit 102, a magnetic field acquisition unit 103, a posture calculation unit 104, a magnetic field reliability evaluation unit 105, and an absolute acceleration conversion unit 107. The coordinate system conversion unit 100 may convert 3 axis acceleration obtained from the acceleration sensor 104 in the device coordinate system into absolute acceleration in the absolute coordinate system.

The absolute coordinate system is used to handle coordinate values measured by various kinds of sensors, which includes the World Geodetic System 1984 (WGS84) used by GPS and the Orthogonal Coordinate System such as the Universal Transverse Mercator Coordinate (UTM) System. Thus, in the absolute coordinate system, a position or a direction of a target may be represented by a distance relationship from the origin which is fixed in a space. The absolute coordinate system is called the "World Coordinate System". On the other hand, the device coordinate system is called the "Body Coordinate System", which defines the origin at a point inside the inertial device 1 and three axes (i.e. x-axis, y-axis, and z-axis) which are orthogonal to each other.

The acceleration acquisition unit 101 may acquire variation of the three-axis acceleration detected by the acceleration sensor 14.

The angular velocity acquisition unit 102 may obtain variation of the three-axis angular velocity detected by the angular velocity sensor 15. Here, the angular velocity may be acquired in the device coordinate system in common with the acceleration.

The magnetic field acquisition unit 103 may acquire the three-dimension magnetic field vector pointing to the magnetic north, which is detected by the magnetic field sensor 106. In this way, the magnetic field acquisition unit 103 may get a direction of the inertial device 1. Here, the direction may be acquired in the device coordinate system in common with the acceleration.

The posture calculation unit 104 may calculate the current posture of the inertial device 1 using the sensor data obtained by the acceleration acquisition unit 101, the angular velocity acquisition unit 102, and the magnetic field acquisition unit 103, and the posture calculation unit 104 may calculate an inverse rotation matrix 106 by an inverse matrix calculation to the calculated posture data (a rotation matrix).

The data obtained by the magnetic field acquisition unit 103 may be unreliable due to an environmental magnetic field in an in-door environment. Thus, the posture calculation unit 104 may use the data obtained by the magnetic field acquisition unit 103 only when the magnetic field reliability evaluation unit 105 (explained later) determines that the data is reliable.

The posture calculation unit 104 may calculate a matrix representing the posture of the inertial device 1 using the Extended Kalman Filter, which is commonly used in the art (See Non-Patent Documents 1, 2, FIGS. 17, 18), and the posture calculation unit 104 may invert the matrix. The detailed procedure is explained below.

General Equations of the Extended Kalman Filter

Figure 17:
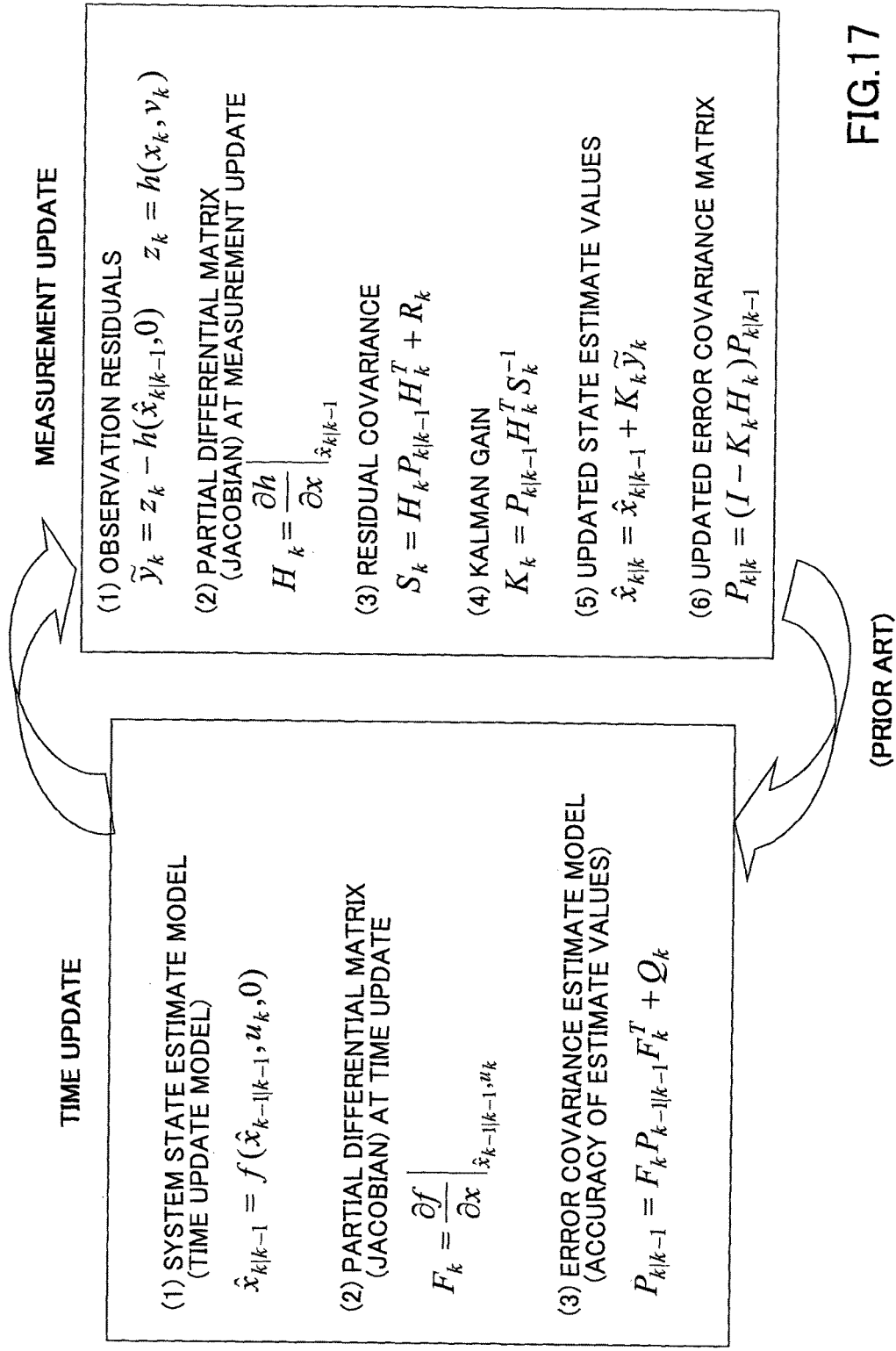
FIG. 17 is a drawing illustrating an equation of the Extended Kalman Filter (prior art).

FIG. 17 is a drawing illustrating an equation of the Extended Kalman Filter. In the calculation of the Kalman Filter, "Time Update" and "Measurement Update" procedures are executed in order to forward a time step. In the Time Update procedure, an estimated state at the present time is calculated from an estimated state at a previous time. In the Measurement Update procedure, the estimated values are corrected using a measurement at the present time and thereby a more precise state may be estimated. By repeating such procedures, the optimal state variables are estimated.

FIG. 18 is a drawing illustrating variables used in the Time Update procedure (prior art). The variables are explained, which correspond to the equations (1)-(3) in the frame named "Time Update" as shown in FIG. 17. Here, "k" indicates a discrete step time, and "k−1" indicates time at the previous step.

FIG. 19 is a drawing illustrating variables used in the Measurement Update procedure. The variables are explained, which correspond to the equations (1)-(6) in the frame named "Measurement Update" as shown in FIG. 17.

Application of the Extended Kalman Filter

The posture calculation unit 104 may use the Time Update procedure in the Extended Kalman Filter to update the posture data derived from the angular velocity sensor 15 (roll, pitch, and yaw angles). In addition, the posture calculation unit 104 may use the Measurement Update procedure in the Extended Kalman Filter to update the posture data derived from the acceleration sensor 14 (roll and pitch angles) (hereinafter called the "first measurement update procedure"). Furthermore, the posture calculation unit 104 may use the Measurement Update procedure to update the posture data derived from the magnetic field sensor 16 (a yaw angle) (hereinafter called the "second measurement update procedure").

In this way, the posture calculation unit 104 may form a seven state Extended Kalman Filter. The posture calculation unit 104 may repeatedly execute the Time Update procedure and the two Measurement Update procedures in parallel and estimate the posture and a'gyro zero point bias value. The posture is represented using a quaternion (vector) as shown below.

$$q = \begin{bmatrix} w \\ x \\ y \\ z \end{bmatrix} = \begin{bmatrix} q_0 \\ q_1 \\ q_2 \\ q_3 \end{bmatrix}$$

The quaternion vector has four variables and may represent a posture of an object. A posture representation using roll, pitch and yaw angles has a problem about a singularity called "Gimbal Lock", but the quaternion may represent any posture without the singularity. The gyro zero point bias value may be represented using three variables $bx_k$, $by_k$, $bz_k$ corresponding to three axes (b is a constant).

In the following, the above-mentioned three procedures (1) to (3) are explained.

The Time Update Procedure

First, with reference to FIGS. 5-7, the time update procedure in the Extended Kalman Filter is explained. The posture calculation unit 104 may execute the procedure and perform time integration according to the time update procedure in the Extended Kalman Filter using gyro output values as input in a state estimation model explained later. In this way, the updated quaternion vector q and an error covariance matrix P are obtained (roll, pitch, and yaw angles).

FIG. 5 is a drawing illustrating (1) variables of the system state estimate model according to an embodiment of the invention in the general equation of the Extended Kalman Filter. Here, the state estimate values at the present are defined as the equation (1)-1 in FIG. 5 using the quaternion vector and the gyro zero point bias value.

$$x_{k|k-1} = [w_k\ x_k\ y_k\ z_k\ bx_k\ by_k\ bz_k]^T$$

The input values $u_k$ are defined as the equation (1)-4 in FIG. 5 using the output values ($\omega_{0xk}$, $\omega_{0yk}$, $\omega_{0zk}$) (rad/sec) of the angular velocity sensor.

$$u_k = \begin{bmatrix} \omega_{xk} \\ \omega_{yk} \\ \omega_{xk} \end{bmatrix} = \begin{bmatrix} \omega_{0xk} - bx_k \\ \omega_{0yk} - by_k \\ \omega_{0zk} - bz_k \end{bmatrix}$$

Thus, the values ($\omega_{0xk}$, $\omega_{0yk}$, $\omega_{0zk}$) indicate angular velocity in which zero point values are substituted and there is no offset. The system state estimation model is represented as the equation (1)-5 in FIG. 5 where $C_1$, $C_2$, $C_3$ are constant.

$$\begin{bmatrix} w_k \\ x_k \\ y_k \\ z_k \\ bx_k \\ by_k \\ bz_k \end{bmatrix} = \frac{1}{2} \begin{bmatrix} 2 & -\omega_x t & -\omega_y t & -\omega_z t & 0 & 0 & 0 \\ \omega_x t & 2 & -\omega_z t & \omega_y t & 0 & 0 & 0 \\ \omega_y t & \omega_z t & 2 & -\omega_x t & 0 & 0 & 0 \\ \omega_z t & \omega_y t & \omega_x t & 2 & 0 & 0 & 0 \\ 0 & 0 & 0 & 0 & C_1 & 0 & 0 \\ 0 & 0 & 0 & 0 & 0 & C_2 & 0 \\ 0 & 0 & 0 & 0 & 0 & 0 & C_3 \end{bmatrix} \begin{bmatrix} w_{k-1} \\ x_{k-1} \\ y_{k-1} \\ z_{k-1} \\ bx_{k-1} \\ by_{k-1} \\ bz_{k-1} \end{bmatrix}$$

FIG. 6 is a drawing illustrating a (2) partial differential matrix (Jacobian) at the time update procedure according to an embodiment of the invention in the general equation of the Extended Kalman Filter. As shown in FIG. 5, the system state estimation model is represented as the equation (1)-5. A right side of the equation (1)-5 is "f". Thus, the partial differential on the right results in the partial differential matrix in the time update procedure.

FIG. 7 is a drawing illustrating an error covariance estimate model $P_{k|k-1}$ according to an embodiment of the invention in the general equation of the Extended Kalman Filter. Process noise $Q_k$ is determined in a system identification process in advance.

$$Q_k = \begin{bmatrix} q_{wk} & 0 & 0 & 0 & 0 & 0 & 0 \\ 0 & q_{xk} & 0 & 0 & 0 & 0 & 0 \\ 0 & 0 & q_{yk} & 0 & 0 & 0 & 0 \\ 0 & 0 & 0 & q_{zk} & 0 & 0 & 0 \\ 0 & 0 & 0 & 0 & q_{bxk} & 0 & 0 \\ 0 & 0 & 0 & 0 & 0 & q_{byk} & 0 \\ 0 & 0 & 0 & 0 & 0 & 0 & q_{bzk} \end{bmatrix}$$

The error covariance matrix at the present time $P_{k|k-1}$ may be calculated using the process noise $Q_k$, the error covariance matrix at the previous step, the partial differential matrix (Jacobian) in the time update procedure $F_k$, and its transposed matrix $F_k^T$ (the equation (3)-5 in FIG. 7). The error covariance matrix at the present time $P_{k|k-1}$ and the matrix $P_{k-1|k-1}$ have 7×7 elements which are real.

The posture calculation unit 104 may execute the time update procedure in the Extended Kalman Filter using the above mentioned model and variables; calculate the posture of the inertial device 1 in the absolute coordinate system; and calculate the inverse rotation matrix of the matrix indicating the posture.

The First Measurement Update Procedure

FIG. 8 shows a drawing illustrating the first measurement update procedure in the Extended Kalman Filter. By executing the procedure, the posture calculation unit 104 may compare angular data in the horizontal direction obtained by the acceleration acquisition unit 101 with horizontal angular data of the present quaternion vector, and the posture calculation unit 104 may correct the difference.

FIG. 8 shows variables included in observation residuals (1) in the general equation of the Extended Kalman Filter.

$\tilde{y}_k$

First, the observation values (vector) at the previous step h are represented as the equation (1)-3 in FIG. 8.

$$h = \begin{bmatrix} 2x_k z_k - 2w_k y_k \\ 2y_k z_k + 2w_k x_k \\ 1 - 2(x_k x_k + y_k y_k) \end{bmatrix}$$

The elements included in the above equation derive from a three dimensional rotation matrix (4×4) and the elements are predetermined. The observation values (vector) $z_k$ is represented as the equation (1)-2 in FIG. 8.

$$z_k = \frac{1}{\sqrt{a_x a_x + a_y a_y + a_z a_z}} \begin{bmatrix} a_x \\ a_y \\ a_z \end{bmatrix}$$

Here, the values ($a_x$, $a_y$, $a_z$) are output from the acceleration sensor 14, which are obtained by the acceleration acquisition unit 101. Using the above-mentioned h and $z_k$, the observation residuals are calculated as shown below.

$\tilde{y}_k$

The partial differential matrix (Jacobian) in the Measurement Update procedure $H_k$ in the general equation of the Extended Kalman Filter (1) is obtained by calculating the partial differential of the observation values h shown in the equation (1)-3 in FIG. 8.

The residual covariance $S_k$ in the general equation of the Extended Kalman Filter (3) is calculated using the observation noise (matrix) $R_k$, the partial differential matrix in the Measurement Update procedure $H_k$, its transposed matrix $H_k^T$, and the error covariance matrix at the present time $P_{k|k-1}$.

$$R_k = \begin{bmatrix} r_1 & 0 & 0 \\ 0 & r_2 & 0 \\ 0 & 0 & r_3 \end{bmatrix}$$

Here, the values ($r_1$, $r_2$, $r_3$) are variances which are determined in a device evaluation process for the acceleration sensor 14 in advance.

The Kalman gain $K_k$ in the general equation of the Extended Kalman Filter (4) is calculated using the error covariance matrix $P_{k|k-1}$ at the present time, the transposed matrix of the partial differential matrix in the Measurement Update procedure $H_k^T$, and the inverse matrix of the residual covariance $S_k^{-1}$. The $K_k$ has 7×3 elements, which are actual numbers.

Similarly, the state estimate values $x_{k|k}$ (5) and the updated error covariance matrix $P_{k|k}$ (6) in the general equation of the Extended Kalman Filter are calculated using the above-mentioned variables.

The posture calculation unit 104 may execute, using the above-mentioned model and variables, the Measurement Update procedure in the Extended Kalman Filter; compare the angle data in the horizontal direction with the horizontal angle data of the present quaternion vector; and correct the difference (for roll and pitch angles only).

The Second Measurement Update Procedure

FIG. 9 is a drawing illustrating the second measurement update of the Extended Kalman Filter. The posture calculation unit 104 may receive a notification indicating that data obtained by the magnetic field acquisition unit 103 is reliable from the magnetic field reliability evaluation unit 105 (explained later). When the data from the magnetic field acquisition unit 103 is reliable, the posture calculation unit 104 may execute the second Measurement Update procedure using a yaw angle calculated from the posture data, which is obtained through the TRIAD algorithm, to correct the yaw angle component of the quaternion vector. The TRIAD algorithm is explained later.

FIG. 9 shows, in common with FIG. 8, variables included in observation residuals (1) in the general equation of the Extended Kalman Filter.

$\tilde{y}_k$

In common with FIG. 8, the observation values (vector) at the previous step h are represented as the equation (1)-3 in FIG. 9. On the other hand, the observation values (vector) $z_k$ are represented as the equation (1)-2 in FIG. 9.

$$z_k = \begin{bmatrix} TRIAD_x \\ TRIAD_y \\ TRIAD_z \end{bmatrix}$$

The above vector indicates a yaw angle direction calculated by the TRIAD algorithm.

In common with the first Measurement Update procedure, the partial differential matrix (Jacobian) in the Measurement Update $H_k$ in the general equation of the Extended Kalman Filter (2) is obtained by calculating the partial differential of the observation values at the previous step h.

The residual covariance $S_k$ in the general equation of the Extended Kalman Filter (3) is calculated using the observation noise (matrix) $R_k$, the partial differential matrix in the Measurement Update $H_k$, its transposed matrix $H_k^T$, and the error covariance matrix at the present time $P_{k|k-1}$.

$$R_k = \begin{bmatrix} T_1 & 0 & 0 \\ 0 & T_2 & 0 \\ 0 & 0 & T_3 \end{bmatrix}$$

Here, the values ($T_1$, $T_2$, $T_3$) are variances which are determined in a device evaluation process for the magnetic field sensor 16 in advance.

In addition, the Kalman gain $K_k$ (4), the updated state estimate values $x_{k|k}$ (5), and the updated error covariance matrix $P_{k|k}$ (6) are calculated in common with the first Measurement Update procedure.

The magnetic field reliability evaluation unit 105 may determine that the magnetic field vector acquired from the magnetic field sensor 16 via the magnetic field acquisition unit 103 is reliable, and the magnetic field reliability evaluation unit 105 may transmit the result to the posture calculation unit 104. It is known that the accuracy of the sensor data from the magnetic field sensor 16 may decrease depending on variation of the earth magnetism and environmental magnetic field surrounding the sensor device. The magnetic field reliability evaluation unit 105 may evaluate the effect and determine that the sensor data is reliable or not. In the following, the determination process is explained.

The magnetic field reliability evaluation unit 105 obtains first posture data (quaternion) which is the latest posture data which has been acquired via the above mentioned procedure. Next, the magnetic field reliability evaluation unit 105 acquires second posture data (quaternion) using reference vectors of the acceleration and the earth magnetism and magnetic field vectors obtained by the magnetic field acquisition unit 103 according to the TRIAD algorithm. The reference vectors of the acceleration and the earth magnetism representing the vertical downward direction are factory-configured or configured by the user.

Calculation of a Posture Using TRIAD Algorithm

Figure 16:
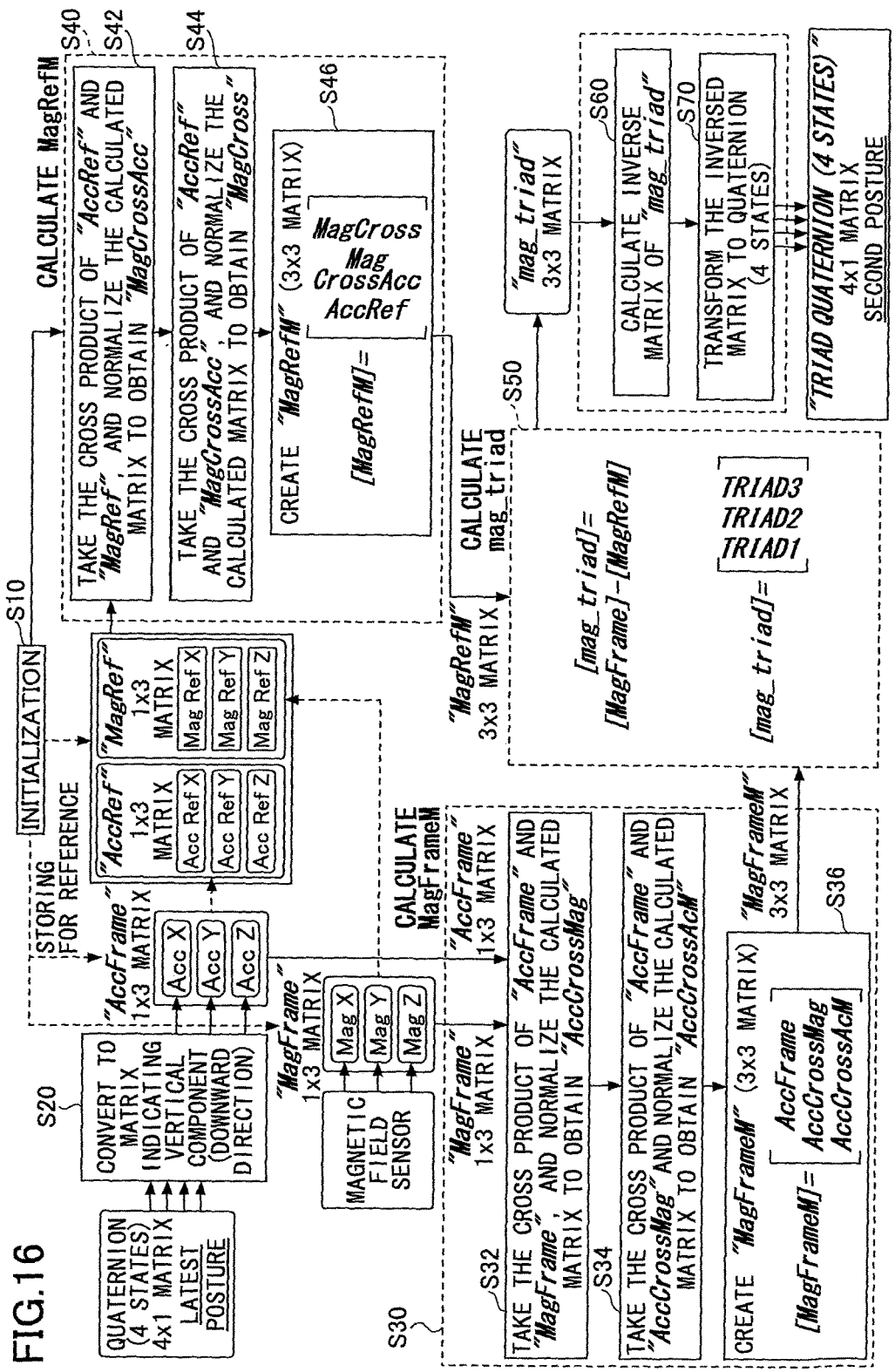
FIG. 16 is a drawing illustrating a procedure to calculate a posture using the TRIAD algorithm.

FIG. 16 is a drawing illustrating a procedure, which is performed by the magnetic field reliability evaluation unit 105, to calculate the second posture data according to the known TRIAD algorithm.

At step S10, an initialization process is performed before the device is shipped or in response to a user's instruction, and reference vectors AccRef and MagRef are stored. The AccRef indicates the vertical downward component of acceleration, and the MagRef is a magnetic field vector. The vector indicating the vertical downward component of acceleration may be calculated from the quaternion as explained at the following step S20. The magnetic field vector points to the compass north input from the magnetic field sensor. That step is only performed before the device is shipped or in response to a user's instruction. Thus, the reference vector keeps the same values unless the initialization process is executed.

At step S20, the magnetic field reliability evaluation unit 105 converts the latest quaternion vector (4×1) indicating the latest posture of the inertial device 1 into a 1×3 (i.e. 1 row, 3 columns) matrix AccFrame indicating the vertical component (downward direction).

At step S30, the magnetic field reliability evaluation unit 105 calculates a 3×3 matrix MagFrameM using the AccFrame and a matrix MagFrame indicating a magnetic field vector acquired by the magnetic field sensor.

At step S32, the magnetic field reliability evaluation unit 105 calculates a matrix AccCrossMag by taking the cross product of the AccFrame and the MagFrame and normalizing the calculated result.

At step S34, the magnetic field reliability evaluation unit 105 calculates a matrix AccCrossAcM by taking the cross product of the AccFrame and the AccCrossMag and normalizing the calculated result.

At step S36, the magnetic field reliability evaluation unit 105 calculates a 3×3 matrix MagFrameM by using the AccFrame, the AccCrossMag calculated at step S32, and the AccCrossAcM calculated at step S34.

At step S40, the magnetic field reliability evaluation unit 105 calculates a 3×3 matrix MagRefM using the AccRef and the MagRef.

At step S42, the magnetic field reliability evaluation unit 105 calculates a matrix MagCrossAcc by taking the cross product of the AccRef and the MagRef and normalizing the calculated result.

At step S44, the magnetic field reliability evaluation unit 105 calculates a matrix MagCross by taking the cross product of the AccRef and the MagCrossAcc and normalizing the calculated result.

At step S46, the magnetic field reliability evaluation unit 105 creates a 3×3 matrix MagRefM by combining the AccRef, the MagCrossAcc calculated at step S42, and the MagCross calculated at step S44, which are transposed respectively.

Step S40 (S42-S46) may be performed when the AccRef and the MagRef are changed after the initialization. Thus, the magnetic field reliability evaluation unit 105 may re-use the stored MagRefM until initialization is performed again.

At step S50, the magnetic field reliability evaluation unit 105 acquires the inner product of the MagFrame and the MagRefM. The acquired matrix is called a "mag triad" (3×3). The mag triad is used to convert the device coordinate system to the absolute coordinate system. In the TRIAD algorithm, three columns are called TRIAD1, TRIAD2, and TRIAD3 respectively.

At step S60, the magnetic field reliability evaluation unit 105 inverts the mag triad (a matrix for conversion between the absolute coordinate system and the device coordinate system) and converts the inverted mag triad to the quaternion. The quaternion indicates the second posture data.

The magnetic field reliability evaluation unit 105 compares a differential value of the first posture data with a differential value of the second posture data calculated by the above-mentioned steps to determine if a difference exists. When there is no difference (i.e. the difference of the differential values is smaller than a threshold value), the magnetic field reliability evaluation unit 105 determines that the data (earth magnetism) acquired by the magnetic field sensor 16 is reliable.

In addition, the magnetic field reliability evaluation unit 105 may improve the accuracy of such an evaluation by using the following criteria:

whether the absolute value of the magnetic field vector is within a predetermined range;

whether depression acquired from the first posture data and the magnetic field vector is within a predetermined range; and whether depression acquired from the second posture data and the magnetic field vector is within a predetermined range.

The range may be defined using depression data and amplitude of the magnetic field vector issued by the Japan Geographical Survey Institute.

When the earth magnetism data is reliable, the second Measurement Update procedure is executed using the yaw angle calculated from the second posture data. Otherwise, the second Measurement Update procedure is not executed.

The absolute acceleration conversion unit 107 multiply the acceleration obtained by the acceleration acquisition unit 101 by the inverse rotation matrix 106 calculated by the posture calculation unit 104 to calculate three axis acceleration in the absolute coordinate system.

3.2 Estimation for Travelling Direction

Direction estimation unit 200 as shown in FIG. 3, which executes the "Estimation for Travelling Direction" function, includes a band-pass filter 201, a peak detection unit 204, a peak position storage unit 205, a converted acceleration storage unit 206, a horizontal component of the converted velocity management unit 207, a vertical component of peak converted acceleration management unit 208, a horizontal component of the converted velocity acquisition unit 209, a cycle acquisition unit 210, a determination unit 211, and a direction calculation unit 212.

The direction estimation unit 200 may calculate a traveling direction of the target for each step based on acceleration obtained by the coordinate system conversion unit 100 in the absolute coordinate system.

The band-pass filter 201 may remove a gravity component from the three axis absolute acceleration output by the coordinate system conversion unit 100. For example, a passband may be about 1-3 Hz which is a general frequency for a walking motion. Note that the passband may vary depending on a frequency for a walking or traveling motion of the target of the inertial device 1. Here, the absolute acceleration in which the gravity component is removed is called a "converted acceleration 202", which is output by the band-pass filter 201. The converted acceleration 202 may be stored in the converted acceleration storage unit 206. In addition, a vertical component of the converted acceleration is represented as a "vertical component of converted acceleration 203". The vertical component of converted acceleration 203 is conveyed to the peak detection unit 204 (explained later).

The peak detection unit 204 may measure the variation (time variation) at the vertical component of converted acceleration 203 of the converted acceleration 202 output by the band-pass filter 201 and detect a lower turning point (peak time or peak positions) of the waveform. The detected peak position is stored in the peak position storage unit 205 (explained later). In the following, a detection method for the lower turning point is explained.

Figure 10:
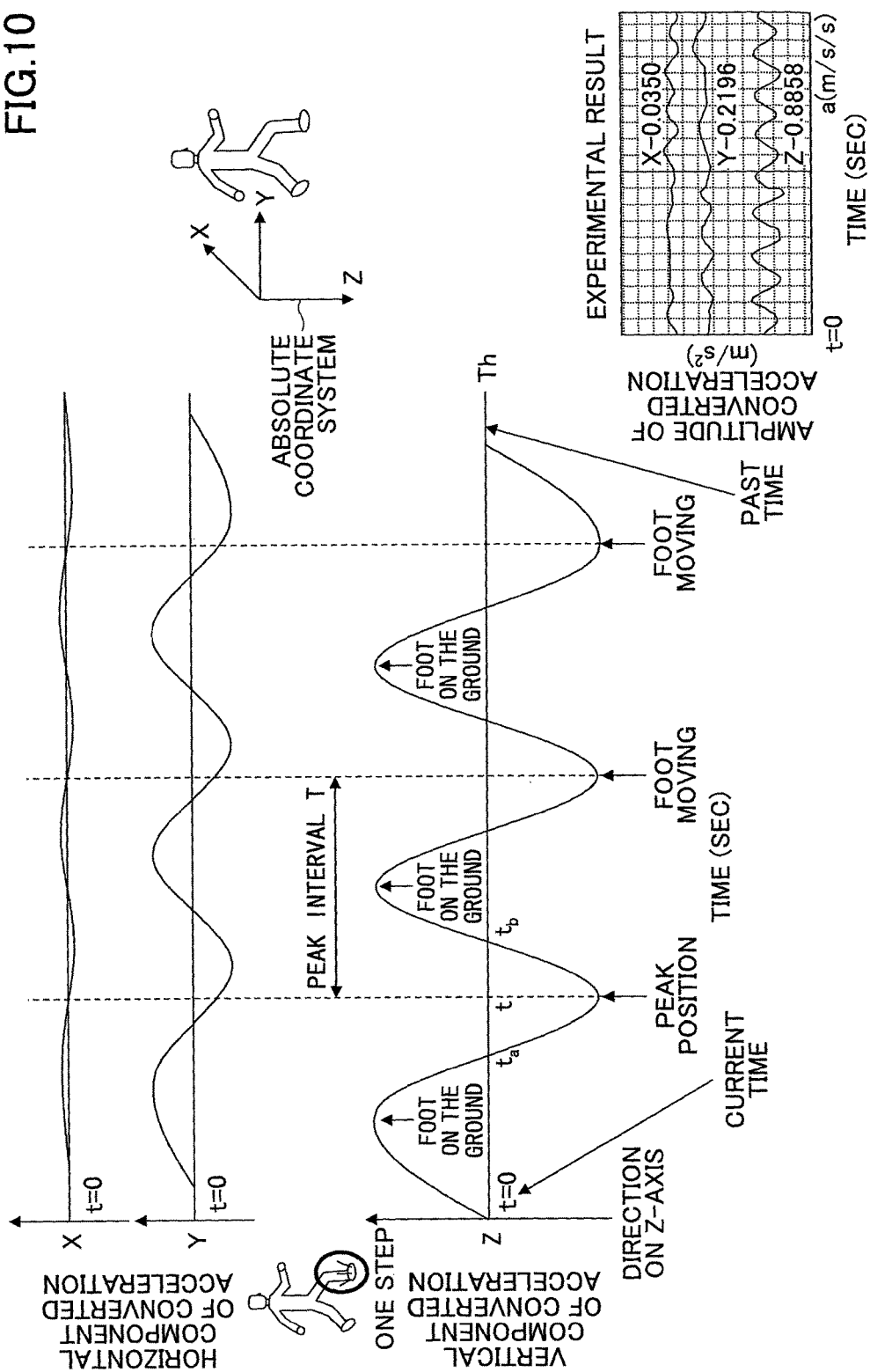
FIG. 10 is a drawing illustrating a procedure to detect a peak.

FIG. 10 shows waveforms indicating variation of the vertical component of converted acceleration 203 (Z) and the horizontal component of the converted acceleration (X, Y) where the abscissa axis indicates time (second). As shown in FIG. 10, each waveform has a cycle corresponding to the moving cycle (e.g. the walking cycle). In particular, the waveform of the vertical component of converted acceleration 203 has a bigger amplitude (from $-1$ m/s$^2$ to 1 m/s$^2$) compared to the horizontal component. The upper turning point appears when a foot of the target touches the ground. The lower turning point appears when one foot passes the other foot.

Figure 20:
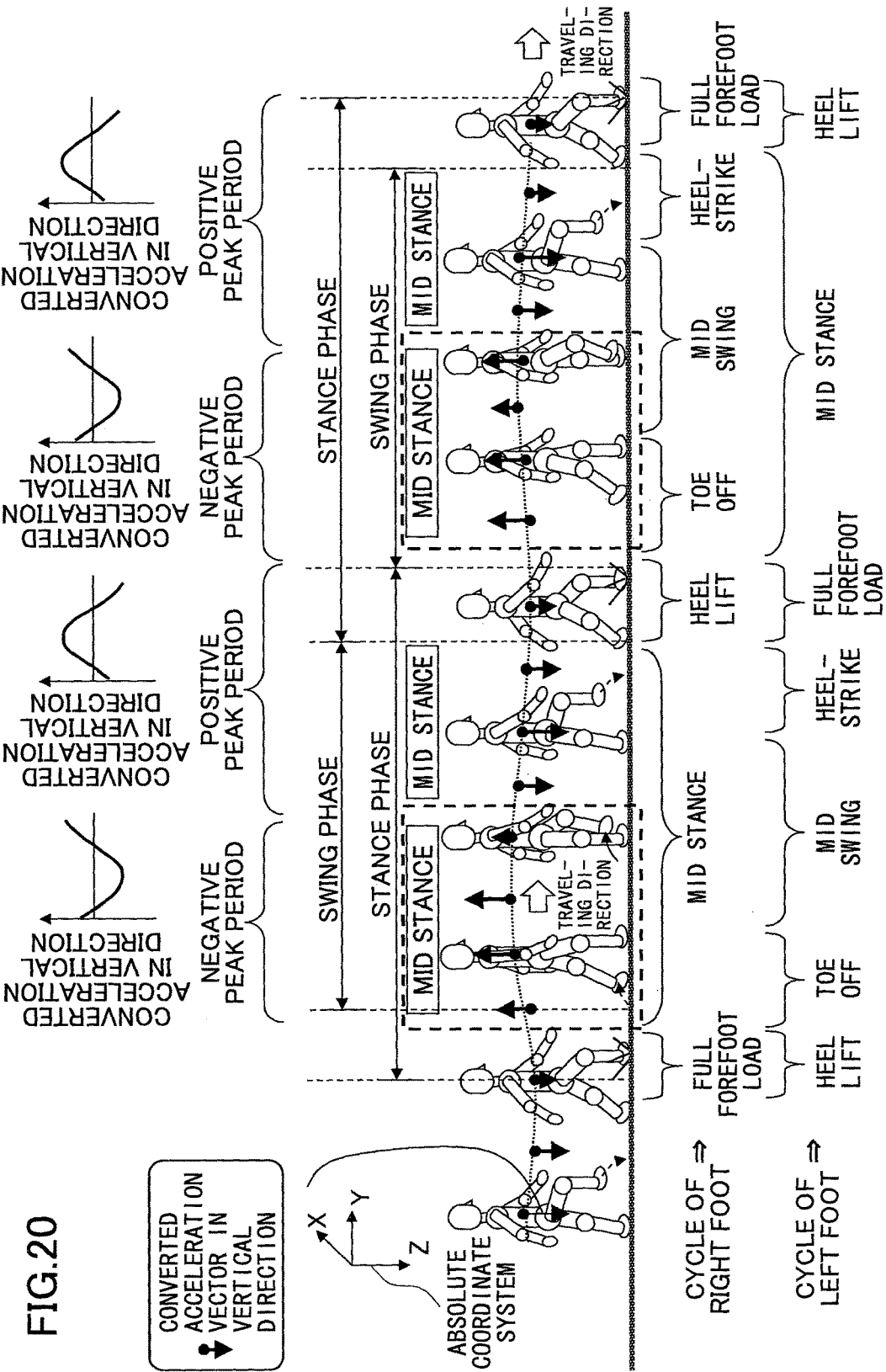
FIG. 20 is a drawing illustrating motion characteristics for walking in the vertical direction.

FIG. 20 is a drawing illustrating motion characteristics for walking in the vertical direction. In general, a walking motion may be categorized by a stance phase and a swing phase according to an inferior limb motion. In the stance phase, a heel of one foot touches the ground and then the toe of the foot rises off the ground. In the swing phase, a toe of one foot rises off the ground and then the heel of the foot touches the ground. In addition, the walking motion is characterized by a double supporting period. In general, when the walking motion becomes slow, the rate of the double supporting period increases, and when the walking motion becomes fast, the rate decreases. In addition, a running motion eliminates the double supporting period. Furthermore, when the user walks straight, it is known that the movement in the vertical direction and horizontal direction is the greatest in a "mid stance" phase.

A first half of the mid stance phase includes a motion in which a lifting foot passes the pivoting foot (a lifting foot passes a point under the trunk at the body). The body moves toward the upper direction, and the converted acceleration occurs at the vertical upper direction. On the other hand, the last half of the mid stance phase includes a motion in which the lifting foot touches the ground. The body moves toward the lower direction, and the converted acceleration occurs at the vertical lower direction.

Figure 21:
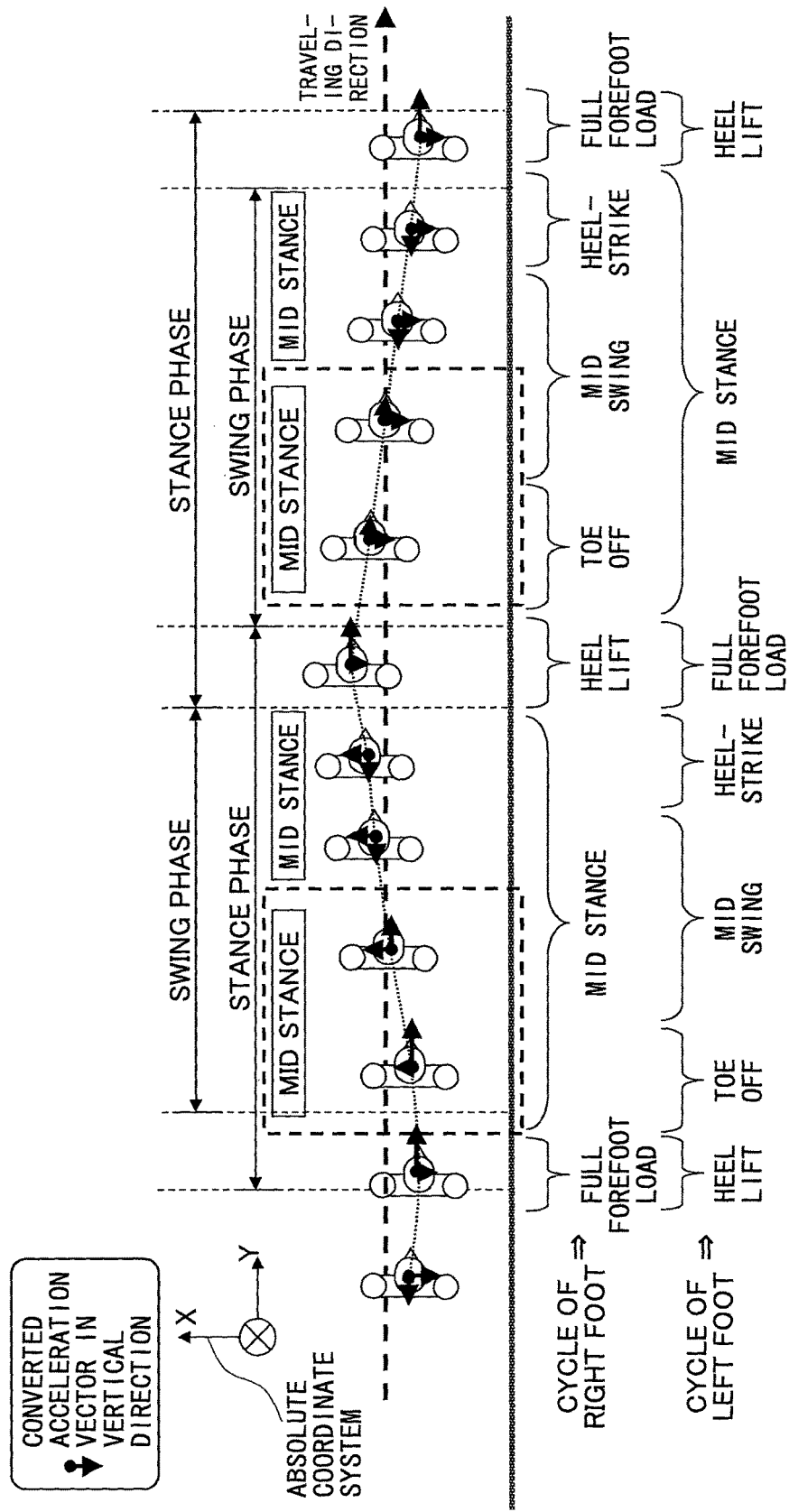
FIG. 21 is a drawing illustrating motion characteristics for walking in the horizontal direction.

FIG. 21 is a drawing illustrating motion characteristics for walking in the horizontal direction. The horizontal component of the converted acceleration in the first half of the mid stance phase is affected by acceleration when a foot is lifted for a movement to a target position; and acceleration due to swaying caused by a movement of the center of gravity. On the other hand, the horizontal component of the converted acceleration in the last half of the mid stance phase is affected by acceleration when a foot is lifted for a movement to a target position; and acceleration due to swaying caused by a movement of the center of gravity. Thus, in the last half of the mid stance phase, the converted acceleration required to lift the foot is not observed.

Accordingly, the inertial device 1 according to an embodiment of this invention may estimate a traveling direction using the converted acceleration in the first half of the mid stance phase which reflects acceleration for lifting a foot to move the body of the target.

Thus, the inertial device 1 may detect, using signal thresholds, a lower turning point in the vertical component of converted acceleration 203 and measure a walking step. Since the converted acceleration in the horizontal direction at the upper turning point (i.e. a foot contacts the ground) is likely to include fluctuation and noise due to the contact, the lower turning point is used to detect the walking step. The converted acceleration in the horizontal direction at the lower turning point is less affected by the contact of the foot and may more precisely represent actual acceleration due to a walking motion.

The peak detection unit 204 may detect the peaks (the turning points) by detecting a moment at which the vertical component of converted acceleration 203 exceeds a predetermined threshold Th after the vertical component of converted acceleration 203 falls below Th. Here, the peak detection unit 204 may specify the peak position by calculating a middle time between the time $t_a$ when the vertical component of converted acceleration 203 falls below Th and the time $t_b$ when the vertical component of converted acceleration 203 exceeds Th. For example, Th may be a half value of the vertical component of converted acceleration observed in an actual walking motion. Any other method may be used to detect the peak position.

In addition, by storing the past peak position, the peak detection unit 204 may calculate a peak interval indicating a time interval between the past peak position and the present peak position.

The peak position storage unit 205 may store the peak position detected by the peak detection unit 204. The peak position storage unit 205 stores the past peak and the latest peak positions using a ring buffer. The peak position storage unit 205 stores at least the latest peak position and the previous peak position. The peak positions are updated by peak positions obtained later. The number of peak positions stored in the peak position storage unit 205 may be modified according to a storage capacity of the inertial device 1.

The converted acceleration storage unit 206 may add time data to the converted acceleration 202 output by the band-pass filter 201 and store them as time sequence data.

The horizontal component of the converted velocity management unit 207 may integrate, when the peak detection unit 204 detects the peak position, the horizontal component of the converted acceleration for each component (x and y) in a predetermined period (τ) centering on the peak position and calculate velocity in the horizontal direction. The velocity is called a "horizontal component of the converted velocity". The horizontal component of the converted velocity is represented as a vector indicating a relative value of a direction and amplitude of the velocity. The horizontal component of the converted velocity management unit 207 may store a set of the horizontal component of the converted velocity and time t. Thus, the horizontal component of the converted velocity management unit 207 has a function to calculate the horizontal component of the converted velocity; and a function to store the horizontal component of the converted velocity.

Figure 11:
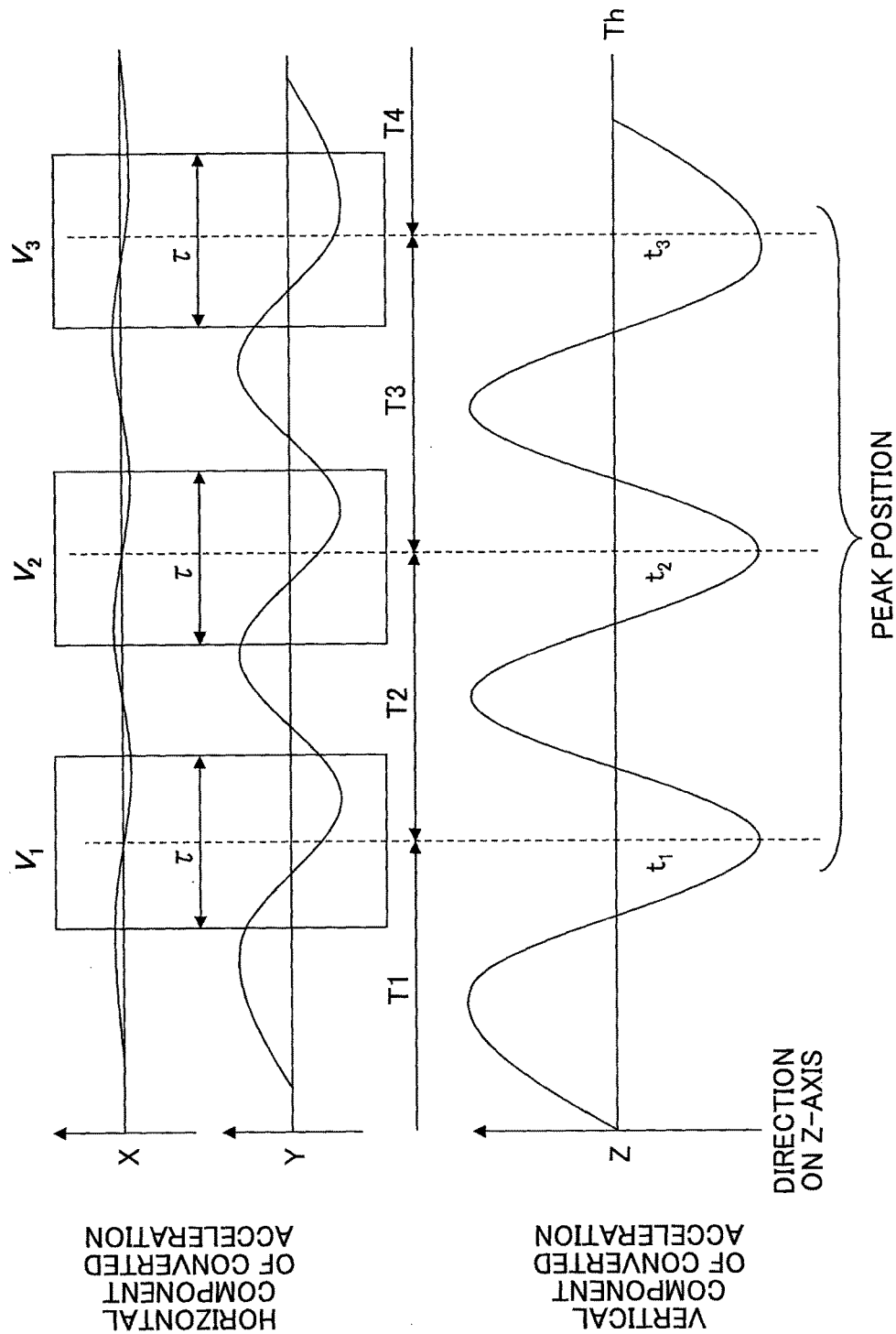
FIG. 11 is a drawing illustrating a procedure to calculate a horizontal component of converted velocity.

FIG. 11 shows waveforms indicating variation of the vertical component of converted acceleration 203 and the horizontal component of the converted acceleration, which correspond to the waveforms shown in FIG. 10. In this example, the horizontal component of the converted velocity management unit 207 may integrate the horizontal components of the converted acceleration with respects to time in predetermined periods (τ) centering on the peak positions $t_1$, $t_2$, and $t_3$ detected from the waveform of the vertical component of converted acceleration 203 and may calculate the horizontal component of the converted velocity $V_1, V_2, V_3$.

It is desirable that the period ($\tau$) is less than or equal to ($t_b-t_a$). This is because, if the horizontal component of the converted velocity management unit 207 performs the integration in the entire time domain, its result is likely to be affected by acceleration occurred by swaying due to a walking motion and acceleration occurred by fluctuation when a heel contacts the ground, and the horizontal component of the converted velocity management unit 207 fails to estimate the traveling direction correctly.

Figure 12:
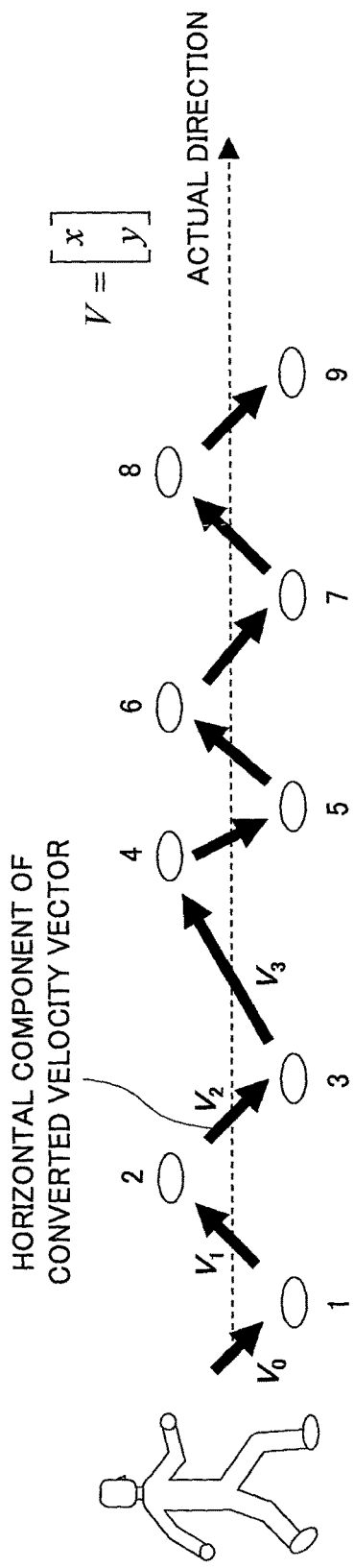
FIG. 12 is a drawing illustrating a procedure to calculate a horizontal component of converted velocity.

The horizontal component of the converted velocity may be generated by the above-mentioned peak detection procedure and the subsequent procedure when one foot passes the pivoting foot. The generated features may be represented as the horizontal component of the converted velocity vector indicating a direction and amplitude of the velocity. As shown in FIG. 12, the horizontal component of the converted velocity vector indicates the direction (traveling direction) and the amplitude of the movement of the target's body from side to side when one foot passes the pivoting foot.

The vertical component of peak converted acceleration management unit 208 may obtain converted acceleration at the peak position (time) in the vertical component of converted acceleration 203 (hereinafter called a "vertical component of the peak converted acceleration"), and may convey the converted acceleration to the determination unit 211 (explained later).

The horizontal component of the converted velocity acquisition unit 209 may obtain the latest and the previous horizontal components of the converted velocity from the horizontal component of the converted velocity management unit 207, and may convey the obtained horizontal component of the converted velocity to the determination unit 211.

The cycle acquisition unit 210 may obtain a plurality of the peak positions from the peak position storage unit 205 and obtain a traveling cycle (e.g. a walking cycle) of the target. In addition, the cycle acquisition unit 210 may obtain the latest and the past traveling cycle by calculating differences of the peak positions. The cycle acquisition unit 210 may pass the obtained traveling cycles to the determination unit 211 (explained later).

Figure 13:
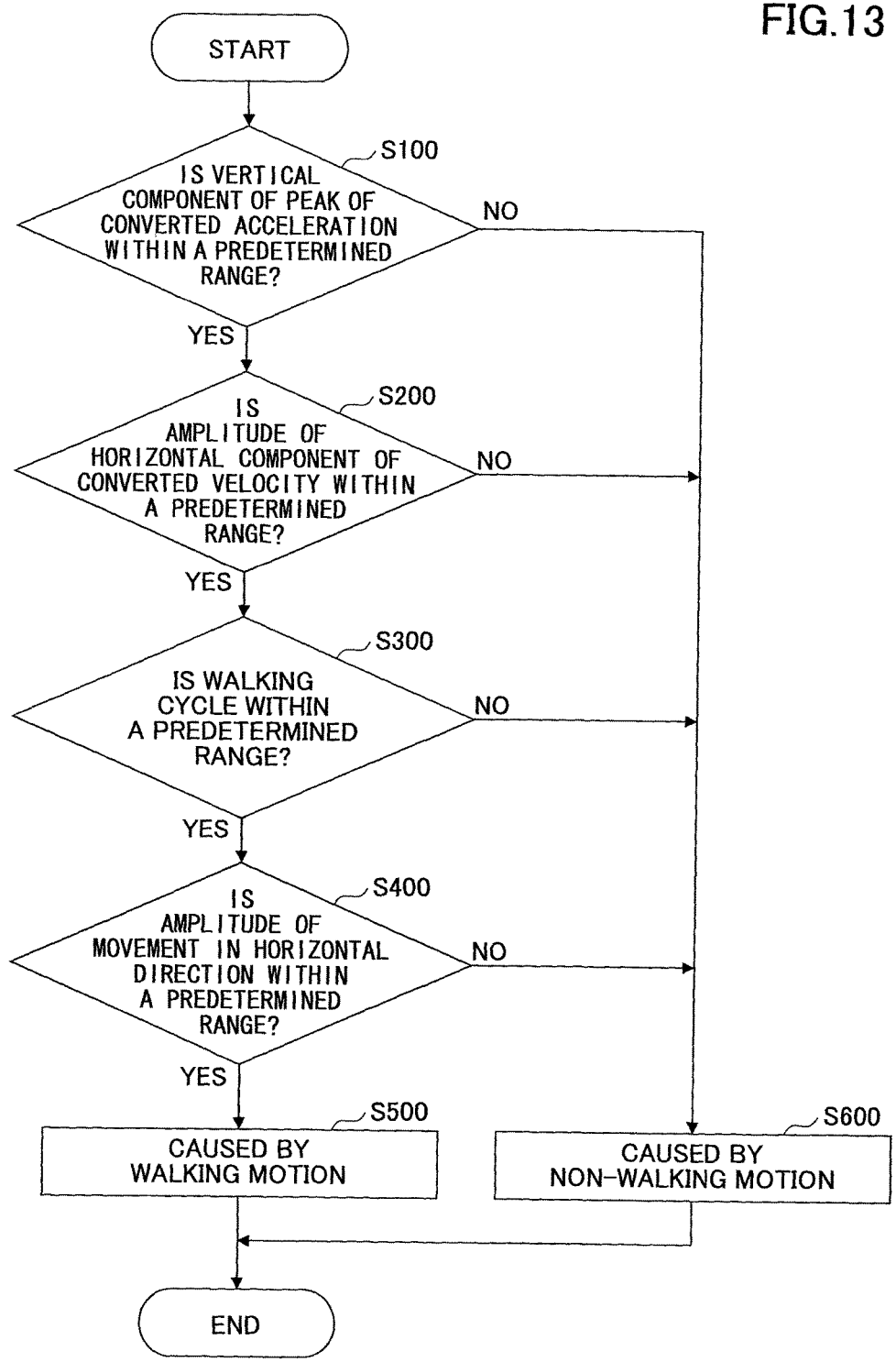
FIG. 13 is a drawing illustrating a determination procedure.

The determination unit 211 may determine that various kinds of data obtained in the above-mentioned procedure derive from an actual walking motion by executing procedures shown in FIG. 13. The walking motion includes a traveling motion performed by the target, which includes the walking motion as well as a running motion. On the other hand, a non-walking motion includes a motion to voluntary or involuntary shake the inertial device 1 or a motion caused by acceleration induced from an external environment (e.g. the target is transported by a traveling object). In the following, the procedure shown in FIG. 13 is explained.

At step S100, the determination unit 211 determines whether the vertical component of the peak converted acceleration obtained from the vertical component of peak converted acceleration management unit 208 falls within a predetermined range. If so, the procedure goes to step S200. Otherwise, the procedure goes to step S600 and the determination unit 211 determines that the detected motion (i.e. data) derives from a non-walking motion. The predetermined range about the vertical component of the peak converted acceleration may be pre-configured by a supplier or a user of the inertial device 1 according to the characteristics of the measurement target (e.g. the walking characteristics of the pedestrian).

Next, in step S200, the determination unit 211 determines whether the amplitude of the horizontal component of the converted velocity obtained from the horizontal component of the converted velocity management unit 207 falls within a predetermined range. In other words, the determination unit 211 determines whether the amplitude of the horizontal component of the converted velocity obtained from the horizontal component of the converted velocity management unit 207 is less than or equal to a threshold value. If so, the procedure goes to step S300. Otherwise, the procedure goes to step S600 and the determination unit 211 determines that the detected motion derives from the non-walking motion. The predetermined range of the horizontal component of the converted velocity may be pre-configured by a supplier or a user of the inertial device 1 according to the characteristics of the measurement target (e.g. the walking characteristics of the pedestrian).

Next, in step S300, the determination unit 211 determines whether the traveling cycle obtained from the cycle acquisition unit 210 falls within a predetermined range. If so, the procedure goes to step S400. Otherwise, the procedure goes to step S600 and the determination unit 211 determines that the detected motion derives from a non-walking motion. The predetermined range of the traveling cycle may be pre-configured by a supplier or a user of the inertial device 1 according to the characteristics of the measurement target (e.g. the walking characteristics of the pedestrian).

Next, in step S400, the determination unit 211 determines whether the amplitude of the movement in the horizontal direction falls within a predetermined range. In other words, the determination unit 211 determines whether the amplitude of the movement in the horizontal direction is less than or equal to a predetermined value. If so, the procedure goes to step S500. Otherwise, the procedure goes to step S600 and the determination unit 211 determines that the detected motion derives from a non-walking motion.

Figure 14:
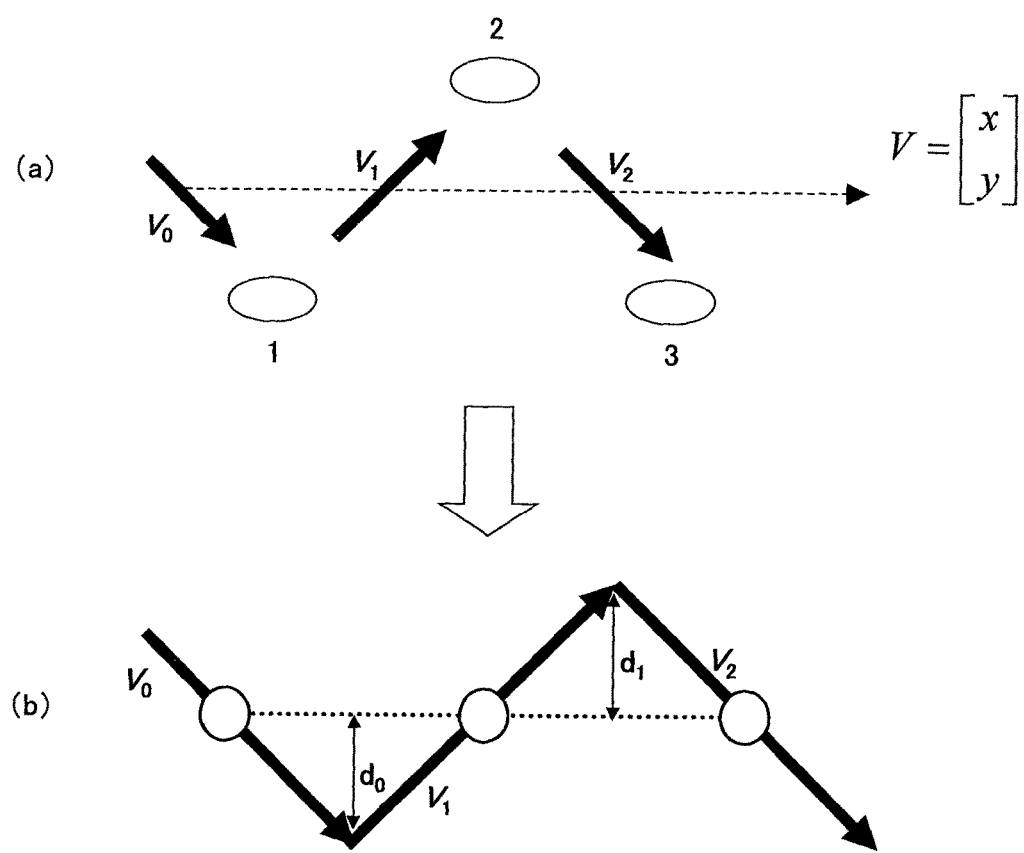
FIG. 14 is a drawing illustrating a procedure to determine variations of converted velocity in the horizontal direction.

Here, with reference to FIG. 14, the variation of the velocity in the horizontal direction is explained. As shown in FIG. 14 (a), in a walking motion, when the user steps forward with the right foot, the converted velocity vector occurs in the right direction, and when the user steps forward with the left foot, the converted velocity vector occurs in the left direction. In order to recognize that motion, the determination unit 211 determines that the horizontal component of the converted velocity vector meets those characteristics.

First, the determination unit 211 combines a start point of the horizontal component of the converted velocity vector and an end point of the horizontal component of the converted velocity vector as shown in FIG. 14 (b). Next, the determination unit 211 calculates a distance $d_n$ between a line connecting centers of $V_n$ vectors and the end point of each $V_n$ vector. Next, the determination unit 211 determines whether $d_n$ falls within a predetermined range, and if so, the determination unit 211 determines that the motion derives from an actual walking motion. The predetermined range about $d_n$ may be pre-configured by a supplier or a user of the inertial device 1 according to the characteristics of the measurement target (e.g. the walking characteristics of the pedestrian).

At step S500, the determination unit 211 determines that the motion derives from an actual walking motion.

At step S600, the determination unit 211 determines that the detected motion derives from a non-walking motion.

Note that one or more steps of the above-mentioned steps S100 to S400 may be omitted. However, when all of the steps are executed, the inertial device 1 may estimate a traveling direction precisely.

When the determination unit 211 determines that the detected motion derives from a walking motion, the direction calculation unit 212 may perform the following procedure to estimate a traveling direction for each step.

When a walking motion of a user transitions from zero steps to the first step, the direction calculation unit 212 obtains the horizontal component of the converted velocity vector $V_0$ from the horizontal component of the converted velocity acquisition unit 209 (See FIG. 15 (a)). Next, when a walking motion of a user transitions from the first step to the second step, the direction calculation unit 212 obtains the horizontal component of the converted velocity vector $V_1$ from the horizontal component of the converted velocity acquisition unit 209 (See FIG. 15 (a)).

Next, the direction calculation unit 212 normalizes the vectors $V_0$, $V_1$ to obtain vectors $V_0'$, $V_1'$. The direction calculation unit 212 calculate a resultant vector of the obtained vectors $V_0'$, $V_1'$, and estimates a traveling direction 213 for each step using a direction of the resultant vector. The above procedure is executed when the user moves forward a step.

As a result, an external application measuring the position of the measurement target may use the traveling direction 213 output by the direction estimation unit 200 to estimate the current position of the target. The application may assume that the target moves forward for a predetermined time toward the direction indicated by the resultant vector $(V_0'+V_1')$ which is calculated by the direction calculation unit 212 to estimate the current position.

In this way, the inertial device 1 according to this embodiment may use the sensor data obtained from the inertial sensors generally used in a smartphone to estimate the traveling direction of the measurement target of the inertial device 1 for each step. Thus, it eliminates the need for high calculation capability because Fourier transformation (FT) or principal component analysis is not performed, which is used in the conventional PDR method. That makes a high performance inertial sensor unnecessary, which performs high rate sampling, and may reduce the cost of the inertial device 1.

In addition, in order to estimate the traveling direction for each step, the inertial device 1 uses the velocity vector in the horizontal direction. The velocity vector is calculated by integrating the acceleration in the absolute coordinate system in a predetermined period centering on the lower peak position (turning point). Since the inertial device 1 uses the acceleration occurred when the user moves a foot to step forward in a direction, the acceleration occurred by swaying due to a walking motion and the acceleration occurred by fluctuation when the heel contacts the ground may be reduced. As a result, the accuracy of the estimated direction may be improved.

Furthermore, the inertial device 1 evaluates the sensor data obtained by the magnetic field sensor, and when the sensor data is reliable, the inertial device 1 uses the sensor data to correct the vector (a yaw angle) indicating the posture of the inertial device 1. It makes it possible to correct the posture vector with great accuracy using the magnetic field sensor data.

For example, a navigation application may use the traveling direction estimated by the inertial device 1 to achieve highly accurate PDR even if an external positioning system such as GPS does not work and the absolute position cannot be measured.

3.3 Estimation Results of Travelling Direction

FIG. 22 is a drawing illustrating an estimate result of the traveling directions at the determination of walking and non-walking motions. FIG. 22 shows an estimate result of the traveling directions when a user who holds the inertial device according to the embodiment of this invention in his right hand performs walking and non-walking motions.

Here, the walking motions and the non-walking motions are explained. First, the user holding the inertial device 1 walks straight, and then the user stops and shakes the inertial device 1 in the vertical direction ten times (i.e. non-walking motions). Subsequently, the user stops about ten seconds, and the user walks straight in the same direction.

FIG. 22 (a) shows an estimate result from the determination unit 211 of the inertial device 1. In this example, when the inertial device 1 determines that the peak of the detected converted acceleration derives from walking motions, a WALK_DETECT flag is output. On the other hand, when the inertial device 1 determines that the peak of the detected converted acceleration derives from non-walking motions, a N_WALK_DETECT flag is output. As shown in FIG. 22 (a), the result reflects the actual motions performed by the user properly.

Here, the inertial device 1 detects the non-walking motions eleven times for the actual non-walking motions (the shaking motions for 10 times). That means the inertial device 1 detects the non-walking motions for noise (disturbance) caused by the actual non-walking motions. Thus, the inertial device 1 may detects the non-walking motions when the user voluntarily or involuntarily moves the inertial device 1 as secondary noise caused by the user's action.

FIG. 22 (b) shows an estimate result of the traveling directions estimated by the direction calculation unit 212 of the inertial device 1 based on the determination result shown in FIG. 22(a). As shown in FIG. 22 (b), only when walking motions are detected, the estimate results of the traveling directions are obtained. On the other hand, when non-walking motions are detected, no estimate result is output.

In this way, the inertial device 1 according to the embodiment of the invention may avoid obtaining wrong estimate results of the traveling direction. As a result, the possibility decreases for displaying wrong positions in an application using the estimated traveling direction such as a navigation application for a pedestrian.

Figure 23:
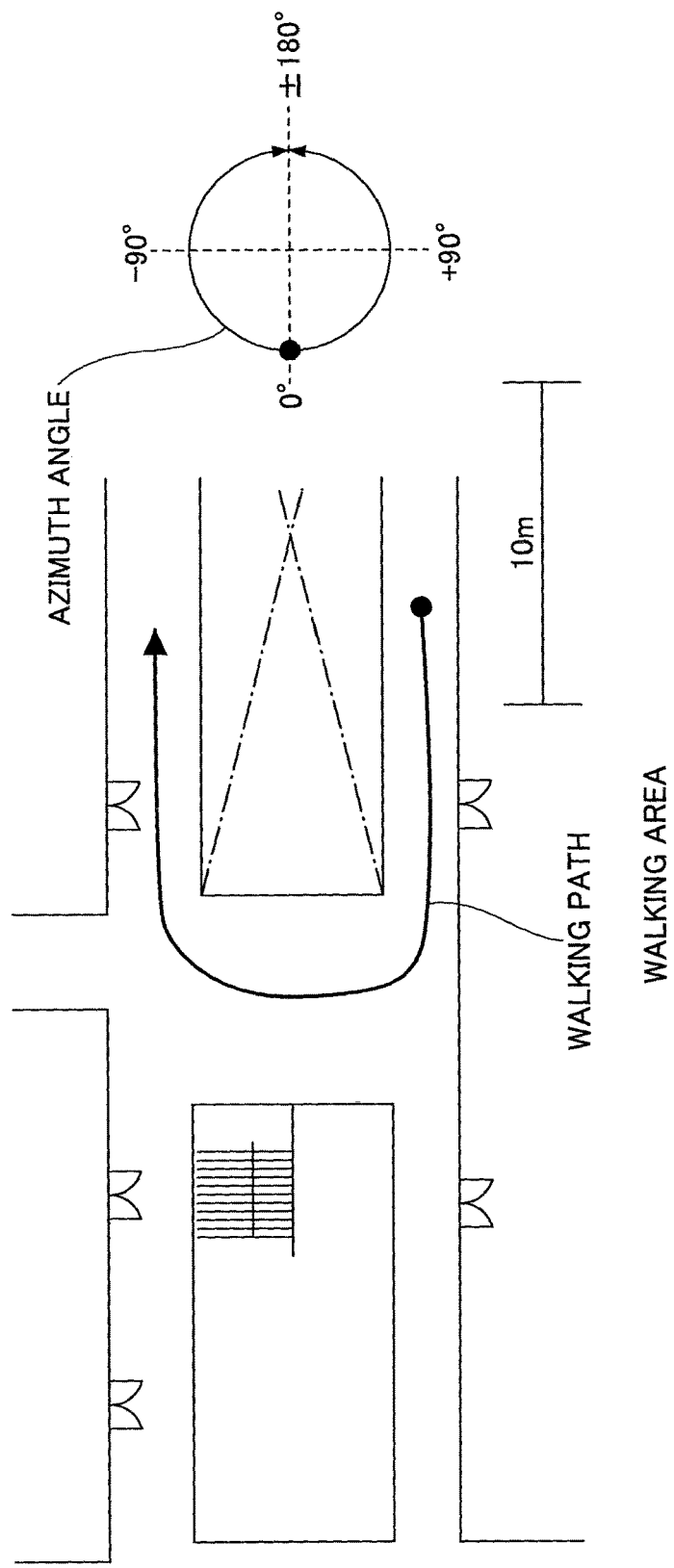
FIG. 23 is a drawing illustrating an estimate result of traveling directions at various positions to hold a device.
Figure 24:
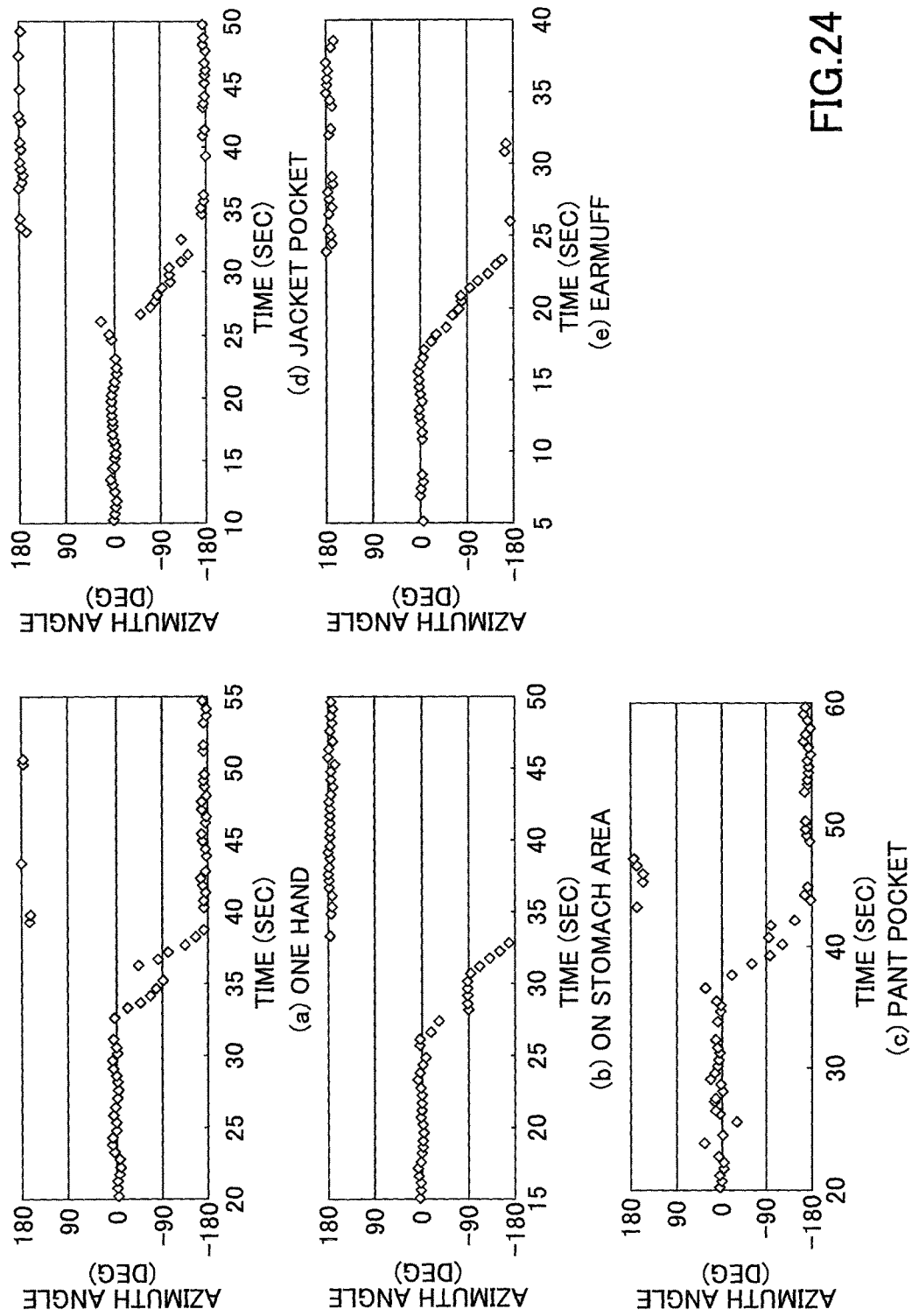
FIG. 24 is a drawing illustrating an estimate result of traveling directions at various positions to hold a device.

FIGS. 23, 24 are drawings illustrating estimate results of traveling directions at various positions holding a device; FIG. 23 shows a walking path on which a user holding the inertial device 1 walks. FIG. 24 (a)-(e) shows estimate results of the traveling directions when the user holds the inertial device 1 in five different aspects.

FIG. 24 (a) shows an estimate result of the traveling directions when the user walks a walking path shown in FIG. 23 while holding the inertial device 1 in his hand.

FIG. 24 (b) shows an estimate result of the traveling directions when the user walks a walking path shown in FIG. 23 while holding the inertial device 1 at his stomach area.

FIG. 24 (c) shows an estimate result of the traveling directions when the user walks a walking path shown in FIG. 23 while putting the inertial device 1 into a pocket of his trousers.

FIG. 24 (d) shows an estimate result of the traveling directions when the user walks a walking path shown in FIG. 23 while putting the inertial device 1 into a pocket of his jacket.

FIG. 24 (e) shows an estimate result of the traveling directions when the user walks a walking path shown in FIG. 23 while putting the inertial device 1 at his ear as making a call.

In FIG. 24 (a)-(e), −180 degree and +180 degree indicate the same azimuth angle. As shown in FIG. 24 (a)-(e), the correct direction may be estimated by the inertial device 1 according to the embodiment of this invention in various aspects of holding the device. As a result, an application such as a navigation application for a pedestrian may improve the accuracy of the navigation.

In the above-mentioned embodiment, the programs executed in each device explained in the embodiment may be in an installable format or in an executable format on a computer-readable recording medium such as a CD-ROM, a flexible disk (FD), a CD-R, or a digital versatile disk (DVD).

The programs executed on each device according to the embodiment may be stored on a computer connected to a network such as the Internet and may be provided by downloading via the network. The programs executed on each device according to the embodiment may be provided or distributed with a network such as the Internet.

Alternatively, the programs executed on each device according to the embodiment may be stored in the ROM in advance and provided.

The above-mentioned inertial device, method and program are not limited to the above embodiments and various variations and modifications may be made without departing from the scope of the present invention. In addition, it is possible to form various inventions by combining any elements which are mentioned above.

The present application is based upon and claims the benefit of priority of Japanese Patent Application No. 2013-018464 filed on Feb. 1, 2013, and Japanese Patent Application No. 2013-230049 filed on Nov. 6, 2013, the entire contents of which are incorporated herein by reference.

Patent Document

[Patent Document 1] Japanese Laid-open Patent Publication No. 2003-302419
[Patent Document 2] Japanese Laid-open Patent Publication No. 2011-237452
[Patent Document 3] Japanese Laid-open Patent Publication No. 2000-97722
[Patent Document 4] Japanese Laid-open Patent Publication No. 2002-139340
[Patent Document 5] Japanese Laid-open Patent Publication No. 2012-145457
[Patent Document 6] Japanese Patent No. 4126388

Non-Patent Document

[Non-Patent Document 1] Greg Welch and Gary Bishop, "An Introduction to the Kalman Filter", Department of Computer Science, University of North Carolina at Chapel Hill, Jul. 24, 2006
[Non-Patent Document 2] Tohru Katayama, "Nonlinear Kalman Filter", Asakura Bookshop, Nov. 25, 2011
[Non-Patent Document 3] Wei Tech Ang et al., "Kalman filtering for real-time orientation tracking of handheld microsurgical instrument", Intelligent Robots and Systems, 2004. (IROS 2004). Proceedings. 2004 IEEE/RSJ International Conference, Sep. 28, 2004, Volume 3, p. 2574-2580 vol. 3
[Non-Patent Document 4] Malcolm D. Shuster, "Deterministic Three-Axis Attitude Determination", The Journal of the Astronautical Sciences, July 2004, Volume 52, No. 3, p. 405-419
[Non-Patent Document 5] "TRIAD Algorithm", [online] Mar. 25, 2011, Wikipedia, Internet, <URL:http://en.wikipedia.org/wiki/User:Snietfeld/TRIA D_Algorithm>

The invention claimed is:

1. An inertial device, comprising:
an acceleration sensor configured to measure accelerations in a horizontal and a vertical direction;
at least one processor configured to execute:
a detection unit configured to detect a plurality of turning points in a waveform representing the acceleration in the vertical direction with respect to time and to detect time at the turning points;
a calculation unit configured to calculate a plurality of velocities at the turning points in the waveform in the horizontal direction using the acceleration in the horizontal direction in a predetermined period centering on the time at each of the turning points;
a determination unit configured to determine whether an amplitude of each of the plurality of velocities in the horizontal direction is less than or equal to a first threshold value and whether an amplitude of a movement of a target in the horizontal direction, which is calculated by the plurality of velocities calculated by the calculation unit, is less than or equal to a second threshold value; and
an estimation unit configured to estimate a direction to which the target having the inertial device moves using velocity in response to a determination by the determination unit that the amplitude of each of the velocities is less than or equal to the first threshold value and that the amplitude of the movement is less than or equal to the second threshold value, wherein the velocity is represented by two vectors, and the estimation unit estimates the direction by combining a start point and an end point of horizontal components of the two vectors, calculating distances between a line connecting centers of the vectors and end points of the vectors, and determining whether the distances are within a predetermined range.

2. The inertial device as claimed in claim 1, the inertial device further having an angular velocity sensor and a magnetic field sensor, further comprising:
an evaluation unit configured to determine that output from the magnetic field sensor is reliable; and
an operation unit configured to calculate posture data representing a posture of the inertial device,
wherein the operation unit calculates the posture data using output only from the acceleration sensor and the angular velocity sensor in response to a determination by the evaluation unit that the output is not reliable, and the operation unit calculates the posture data using the output from the magnetic field sensor in addition to the output from the acceleration sensor and the angular velocity sensor in response to a determination by the evaluation unit that the output is reliable.

3. The inertial device as claimed in claim 2, wherein the evaluation unit determines that the output from the magnetic field sensor is reliable by comparing first posture data with second posture data, the operation unit calculates the first posture data using the output from the acceleration sensor and the angular velocity sensor, and the operation unit calculates the second posture data using the calculated first posture data, pre-configured reference data for output of the acceleration sensor and the angular velocity sensor, and the output from the magnetic field sensor.

4. The inertial device as claimed in claim 3, wherein each of the first posture data and the second posture data is represented by a quatemion vector.

5. The inertial device as claimed in claim 4, wherein the evaluation unit determines that the output of the magnetic field sensor is reliable when a difference between differential values of the first posture data and the second posture data is less than or equal to a predetermined value.

6. The inertial device as claimed in claim 2, wherein the operation unit performs:
 a first procedure to calculate the posture data regarding roll, pitch, and yaw angles using the output of the angular velocity sensor;
 a second procedure to calculate the posture data regarding roll and pitch angles using the output of the acceleration sensor; and
 a third procedure to calculate the posture data regarding a yaw angle using the output of the magnetic field sensor.

7. The inertial device as claimed in any one of claim 1, wherein the acceleration in the vertical direction is negative at each of the turning points.

8. The inertial device as claimed in claim 7, wherein when the acceleration in the vertical direction at each of the turning points is less than or equal to a predetermined value, the estimation unit estimates the direction to which the target having the inertial device moves, and when the acceleration in the vertical direction at each of the turning points is more than the predetermined value, the estimation unit refrains from estimating the direction to which the target having the inertial device moves.

9. The inertial device as claimed in any one of claim 1, further comprising a cycle acquisition unit configured to obtain a cycle of foot motion of the target using time at the plurality of turning points detected by the detection unit, wherein when the cycle equals to or less than a predetermined value, the estimation unit estimates the direction to which the target having the inertial device moves.

10. The inertial device as claimed in claim 1, wherein the predetermined period is less than or equal to a half-cycle time period of the waveform.

11. A method performed by an inertial device, comprising:
 measuring accelerations in a horizontal and a vertical direction by an acceleration sensor included in the inertial device;
 detecting a plurality of turning points in a waveform representing the acceleration in the vertical direction with respect to time and to detect time at the turning points by at least one processor;
 calculating a plurality of velocities at the turning points in the waveform in the horizontal direction using the acceleration in the horizontal direction in a predetermined period centering on the time at each of the turning points by the at least one processor; and
 determining whether an amplitude of each of the plurality of velocities in the horizontal direction is less than or equal to a first threshold value and whether an amplitude of a movement of a target in the horizontal direction, which is calculated by the plurality of velocities calculated in the calculation, is less than or equal to a second threshold value by the at least one processor; and
 estimating a direction to which the target having the inertial device moves using the velocities in response to the determination that the amplitude of each of the velocities is less than or equal to the first threshold value and that the amplitude of the movement is less than or equal to the second threshold value by at least one processor,
 wherein velocity is represented by two vectors, and the step of estimating the direction comprises combining a start point and an end point of horizontal components of the two vectors, calculating distances between a line connecting centers of the vectors and end points of the vectors, and determining whether the distances are within a predetermined range.

12. A non-transitory computer readable medium storing a program for causing an inertial device having an acceleration sensor which is operable to output accelerations in a horizontal and a vertical direction, and at least one processor to perform a method comprising steps of:
 detecting a plurality of turning points in a waveform representing the acceleration in the vertical direction with respect to time and to detect time at the turning points;
 calculating a plurality of velocities at the turning points in the waveform in the horizontal direction using the acceleration in the horizontal direction in a predetermined period centering on the time at each of the turning points; and
 determining whether an amplitude of each of the plurality of velocities in the horizontal direction is less than or equal to a first threshold value and whether an amplitude of a movement of the target in the horizontal direction, which is calculated by the plurality of velocities calculated in the calculation, is less than or equal to a second threshold value; and
 estimating a direction to which a target having the inertial device moves using the velocities in response to the determination that the amplitude of each of the velocities is less than or equal to the first threshold value and that the amplitude of the movement is less than or equal to the threshold value,
 wherein velocity is represented by two vectors, and the estimation unit estimates the direction by combining a start point and an end point of horizontal components of the two vectors, calculating distances between a line connecting centers of the vectors and end points of the vectors, and determining whether the distances are within a predetermined range.

* * * * *

UNITED STATES PATENT AND TRADEMARK OFFICE
CERTIFICATE OF CORRECTION

| | | |
|---|---|---|
| PATENT NO. | : 10,234,293 B2 | |
| APPLICATION NO. | : 14/763184 | |
| DATED | : March 19, 2019 | |
| INVENTOR(S) | : Yusuke Matsushita | |

It is certified that error appears in the above-identified patent and that said Letters Patent is hereby corrected as shown below:

On the Title Page

Please correct Item (54): The Title of Invention and Column 1, Lines 1-3 in the Specification
INERTIAL DEVICE INCLUDING AN ACCELERATION, METHOD PERFORMED BY THE SAME, AND PROGRAM To:
INERTIAL DEVICE INCLUDING AN ACCELERATION SENSOR, METHOD PERFORMED BY THE SAME, AND PROGRAM Signed and Sealed this
Ninth Day of July, 2019

Andrei Iancu
*Director of the United States Patent and Trademark Office*